United States Patent [19]

Suzuki et al.

[11] 4,348,106

[45] Sep. 7, 1982

[54] GUIDE APPARATUS FOR MOVABLE CONTACT GLASS IN ELECTROPHOTOGRAPHIC COPYING MACHINES

[75] Inventors: Shigeru Suzuki, Yokohama; Yukihiro Ohno, Tokyo; Nobuyuki Yanagawa, Chigasaki; Yasunori Kawaishi, Tokyo, all of Japan

[73] Assignee: Ricoh Co., Ltd., Tokyo, Japan

[21] Appl. No.: 148,952

[22] Filed: May 12, 1980

[30] Foreign Application Priority Data

May 18, 1979 [JP] Japan .................................. 54-61922
May 31, 1979 [JP] Japan .................................. 54-67921
Jun. 27, 1979 [JP] Japan .................................. 54-81088

[51] Int. Cl.$^{3}$ .............................................. G03B 27/62
[52] U.S. Cl. .......................................... 355/75; 355/8
[58] Field of Search ...................................... 355/75, 8

[56] References Cited

U.S. PATENT DOCUMENTS 3,914,044 10/1975 Ogawa .................................. 355/8
4,136,941 1/1979 Sawaoka ................................ 355/8
4,159,173 6/1979 Kasuga .................................. 355/8

*Primary Examiner*—Monroe H. Hayes
*Attorney, Agent, or Firm*—Wyatt, Gerber, Shoup, Scobey & Badie

[57] ABSTRACT

A guide apparatus for guiding a movable contact glass, which serves as an original table in an electrophotographic copying machine, to a predetermined exposure position for slit exposure, without any inclination of the contact glass, comprising a drive member for reciprocating the contact glass in the exposure scanning direction and a guide member, which is shorter than the distance from the exposure position to the center of gravity of the contact glass at completion of the exposure scanning and whose upper surface at the exposure position is higher than the other upper surface thereof. The drive apparatus comprises a loop drive transmission member which is rotated in one direction and which substantially reciprocates the contact glass and can have a lock release apparatus capable of making the contact glass movable manually when the contact glass is stopped at its dead point.

9 Claims, 40 Drawing Figures

GUIDE APPARATUS FOR MOVABLE CONTACT GLASS IN ELECTROPHOTOGRAPHIC COPYING MACHINES

BACKGROUND OF THE INVENTION

The present invention relates to a guide apparatus for guiding a movable contact glass supporting an original document places thereon for use in an electrophotographic copying machine.

Referring to FIGS. 1(*a*), 1(*b*), and 1(*c*), a conventional guide apparatus for guiding a movable contact glass, which serves as a support for an original and constitutes part of an exposure apparatus in an electrophotographic copying machine, will now be explained. In the guide apparatus, the contact glass is guided along straight rail members in the exposure scanning direction, so that the image of the original document is scanned and subjected to a slit exposure. The scanning light reflected from the original document is projected successively onto a photoconductor through an image formation member so that an image corresponding to the image of the original document is formed on the photoconductor. More specifically, in a conventional guide apparatus for such a movable contact glass as is cited in Japanese Patent Publication No. Sho 49-12184, the movable contact glass is guided by a pair of parallel rail members. One rail member is disposed along an upper edge of the contact glass and the other rail member is disposed along a lower edge of the contact glass. When a print button is depressed, the movable contact glass is automatically reciprocated, while being held between the rail members, so that the image of the original document can be scanned.

Referring to FIG. 1(*a*), there is shown a straight rail member A for guiding a movable contact glass B in the conventional guide apparatus. Above the rail member A there is located the center of gravity G of the movable contact glass B. In this guide apparatus, the image of the original document, is transported successively past an exposure position F. The actual distance $L_1$ between the surface of a photoconductor drum C and an original document stacking surface D of the contact glass B should be maintained equal to an optical path L or a conjugate optical path which is determined by an image formation member, for example, an image formation lens E.

However, if the electrophotographic copying machine provided with the above-mentioned guide apparatus is made compact in size, the center of gravity B of the contact glass maybe moved beyond an upper position of the rail member A when the scanning is initiated or terminated as illustrated in FIGS. 1(*b*) and 1(*c*), so that a portion of the contact glass B on the side of the exposure position F tends to be moved upwards. When the original document stacking surface D is moved beyond the set optical path L, the image of the original document is not formed accurately on the surface of the photoconductor drum C. If the upward movement of the contact glass B is within the range that can be covered by the depth of focus of the lens E, it does not have an adverse effect on the image formed on the surface of the photoconductor drum C. However, if the upward movement is out of that range, it has an adverse effect on the image formed on the photoconductor drum C. This is a problem when ordinary lenses are employed. In particular, when light condensing optical elements whose depth of focus is small are employed, it becomes a serious problem.

Furthermore, when the electrophotographic copying machine is constructed in such a manner that one side edge portion of the contact glass is simply mounted on the rail member A in order to make the electrophotographic copying machine simpler in construction and less expensive, a gap greater than the permissible clearance between the contact glass B and the rail member A may be formed during reciprocation of the contact glass. From this point of view, it is required that the above-mentioned adverse effect be eliminated.

As a reciprocating drive apparatus for reciprocating the contact glass through the above-mentioned guide apparatus, a reciprocating drive apparatus as shown in FIG. 2 is known. This reciprocating drive apparatus can be used for reciprocating not only the contact glass but also other exposure optical systems.

In FIG. 2, a pin 4 is attached to a chain 3 trained over two sprockets 1 and 2. The pin 4 is fitted in a slot 5*a* of a bracket 5. A movable member 6, such as a contact glass or an exposure optical system, is mounted on the bracket 5. When the drive sprocket 1 rotates in the direction of the arrow, the chain 3 is rotated in the direction of the arrow. At this moment, by the movement of the pin 4, the bracket 5 and the movable member 6 are moved forwards from a start position St in the direction of the arrow and reach an end position E after having completed one stroke l. At this moment, the pin 4 is located at a left end position which is indicated by the imaginary line. With a further rotation of the chain 3, the movable member 6 is moved backwards from the end position E and is then returned to the start position St. Thus, the movable member 6 makes one reciprocating movement by one rotation of the chain 3.

In the drive mechanism for reciprocating the contact glass, which comprises the above-mentioned chain loop mechanism, two clutches are not required; rather, only one clutch is sufficient for moving the contact glass in the opposite directions.

Furthermore, starting, changing movement direction, and stopping the contact glass can be performed smoothly. By setting the stop position of the drive mechanism at the dead point of the pin 4 attached to the chain 3, the contact glass can be self-locked at its start position, without requiring any particular means. By this self-locking, the contact glass can be fixed automatically even if an outer force is applied thereto.

On the other hand, when the electrophotographic copying machine is not operated, there may be a necessity for moving the contact glass or its optical system manually to some desired position, for instance, for the maintenance of the copying machine or for moving jammed sheets from the copying machine. However, in the conventional electrophotographic copying machines, since the pin 4 (FIG. 2) is located at the dead point, the contact glass cannot be moved manually even if moving the contact glass by force is attempted. This is one of the shortcomings of the conventional electrophotographic copying machines having such a drive apparatus.

Usually, in the electrophotographic copying machines, the image of the original document is subjected to exposure scanning by reciprocating the contact glass or the exposure optical system, so that a latent electrostatic image corresponding to the image of the original document is formed on a latent electrostatic image bearing member. Furthermore, a sequence control of various copying steps is conducted in some electrophotographic copying machines. In order to conduct the sequence control, in the conventional electrophotographic copying machines, a pin 7 is secured to a lower portion of the bracket 5 as shown in FIG. 2. When the bracket 5 is moved forwards, the pin 7 kicks a control member 8, so that the control member 8 is turned counterclockwise about a shaft 9. At this moment, a stop pawl 8*a* of the control member 8 releases a one-way rotation clutch 11, such as a spring clutch, so that a pair of sheet feeding rollers 12 are rotated, whereby a copying sheet S which has been in a waiting position is transported in the direction of the arrow and reaches an image transfer section of the electrophotographic copying machine.

Thus, by utilizing the movement of the bracket 5, the control member 8 is operated and a controlled system, such as the sheet feeding mechanism, is operated with the proper timing. In the above-mentioned sheet feeding mechanism, the path of the pin 7 of the bracket is linear, and the control member 8 has to be operated one time during one reciprocation of the bracket 5. Therefore, it is required that, when the bracket 5 is in backward movement, the control member 8 be rectracted from the path of the pin 7 in order that the control member 8 not be operated. If the control member 8 is not designed so as to be retracted from the path of the pin 7 during the backward movement of the pin 7, the pin 7 may collide with the control member 8 and make it impossible for the bracket 5 to move backwards. Therefore, some means for retracting a top end 8*b* of the control member 8 from the path of the pin 7 is required. Various types of such means have been proposed, but they have shortcomings in that they are complicated in mechanism and erroneous operations are apt to occur.

SUMMARY OF THE INVENTION

It is therefore the first object of the invention to provide a guide apparatus capable of guiding a movable contact glass in such a manner that the actual optical path $L_1$ from the original document stacking surface of the contact glass to the surface of the photoconductor is maintained at a predetermined length when the contact glass is reciprocated in the exposure scanning direction and comes to a predetermined exposure position successively.

In order to attain this object, in a guide apparatus according to the invention, the original document stacking surface of the contact glass is successively guided in the exposure scanning direction to a predetermined exposure position and a guide member for guiding the contact glass is designed in such a manner that the distance from the predetermined exposure position to an end of the contact glass is shorter than the distance from the predetermined position to the center of gravity of the contact glass at the completion of the exposure scanning and, furthermore, the guide member is formed in a shape such that its upper surface in contact with the contact glass at the exposure position is higher than the other portions of the guide member.

According to the invention, when the center of the gravity of the contact glass is positioned beyond the the guide member, the optical path $L_1$ can be maintained constant. Therefore, it is possible to reduce the size of the exposure apparatus of an electrophotogaphic copying machine. Furthermore, since the guide apparatus is simple in construction, it can be manufactured at low cost.

The second object of the invention is to provide a self-lock release apparatus which makes it possible to move the contact glass manually by detaching a drive pin from a self-locked position of the contact glass, using a self-lock release knob or lever in order to move the self-locked contact glass manually without operating any drive clutch.

According to the invention, by a simple self-lock release knob, manual self-lock release of the contact glass can be accomplished, utilizing the self-lock mechanism of a chain loop scanning drive system, whereby the space occupied by the contact glass can be minimized when the copying machine is not used, and furthermore, maintenance of the copying machine can be performed without any related difficulty. Furthermore, since the start position of the contact glass is in the return path for the chain loop to start, the contact glass can return to its start position directly, taking a minimum path, when the operation of the copying machine is resumed, without unnecessary forward movements.

The third object of the invention is to provide an improved drive apparatus for driving a movable member, such as a contact glass or an optical system in electrophotographic copying machines, in which a projection is attached to a loop drive member, such as an endless chain chain or belt, and a control member is operated for controlling various copying steps in the copying machine, using the projection.

According to the invention, a drive apparatus for driving the movable member can be provided, which is simple in mechanism and does not require any release means for the control member to be capable of performing sequence control of various copying steps in the copying machine.

FIGS, 29, 31, 33 and 34 are each plan views of different types of detaching apparatus.

Figure 21:
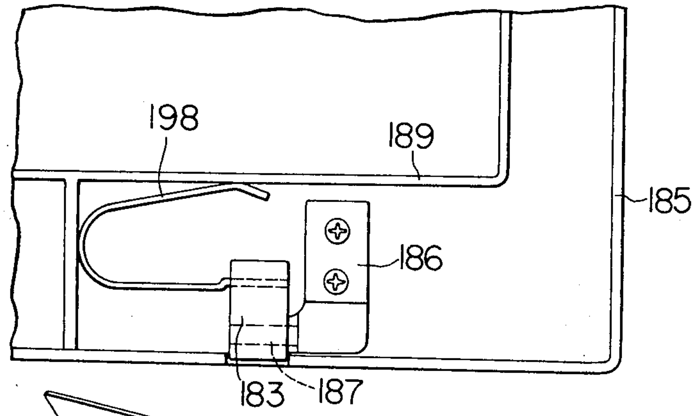
FIG. 21 shows schematically another pressure plate holding apparatus.
Figure 30:
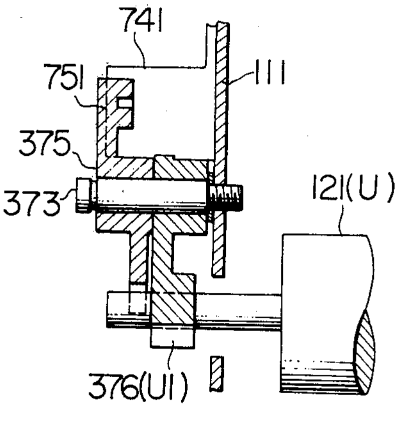
Figure 32:
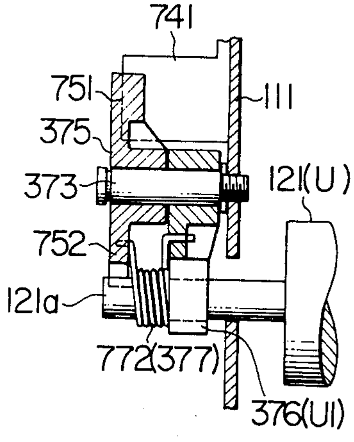
Figure 29:
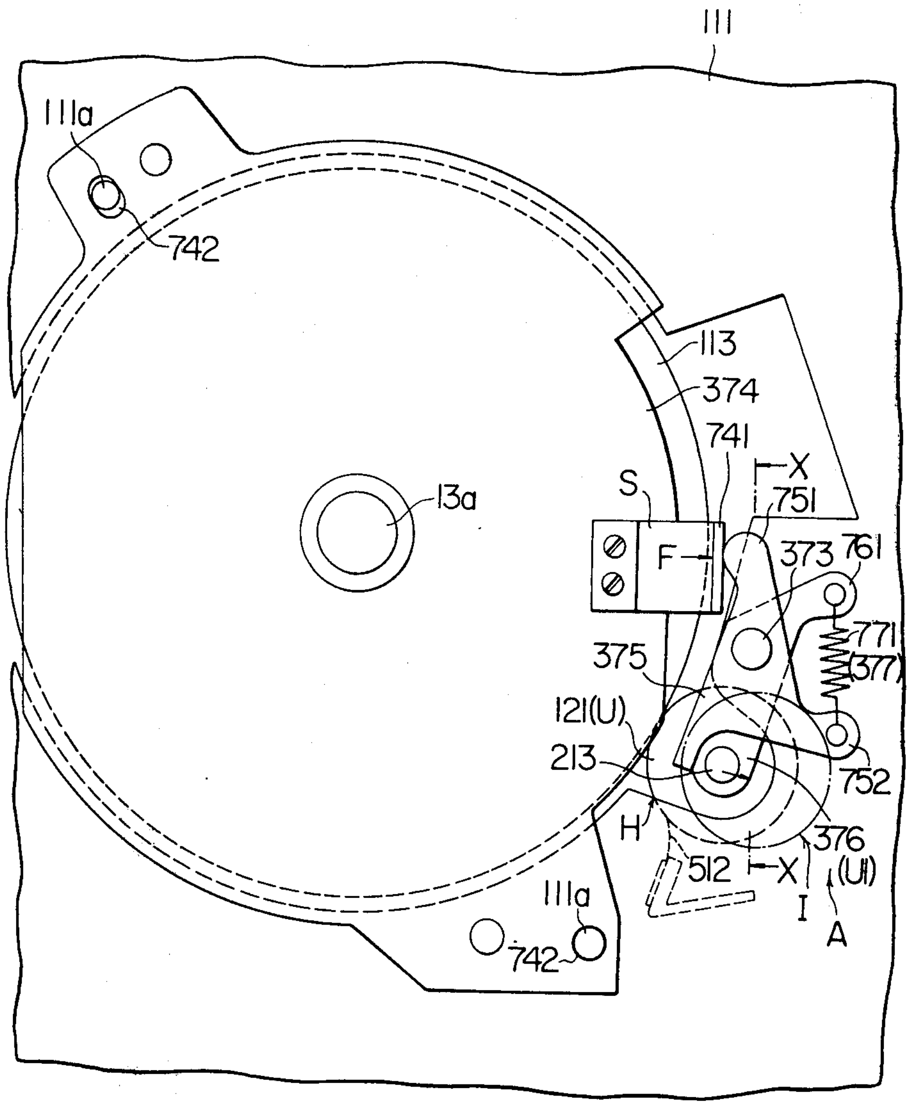

FIGS. 30 and 32 are a cross section taken on line X—X in FIG. 29 and a cross section taken on line Y—Y in FIG. 21, respectively.

Figure 35:
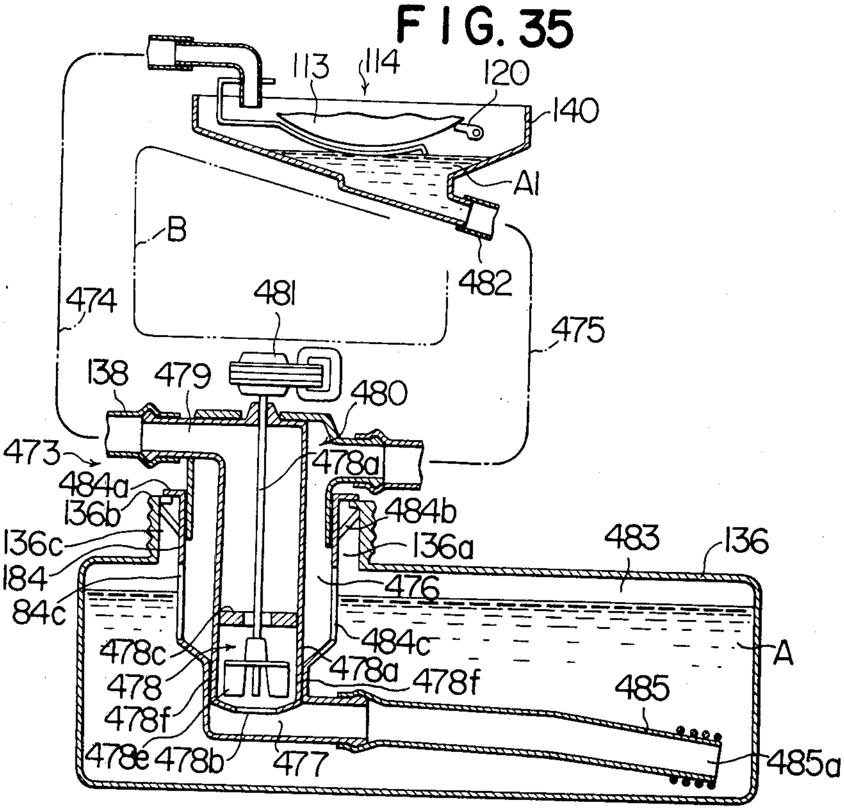

FIG. 35 is a schematic cross section of a liquid developer circulation system and a developer pump with a developer flow route.

Figure 37:
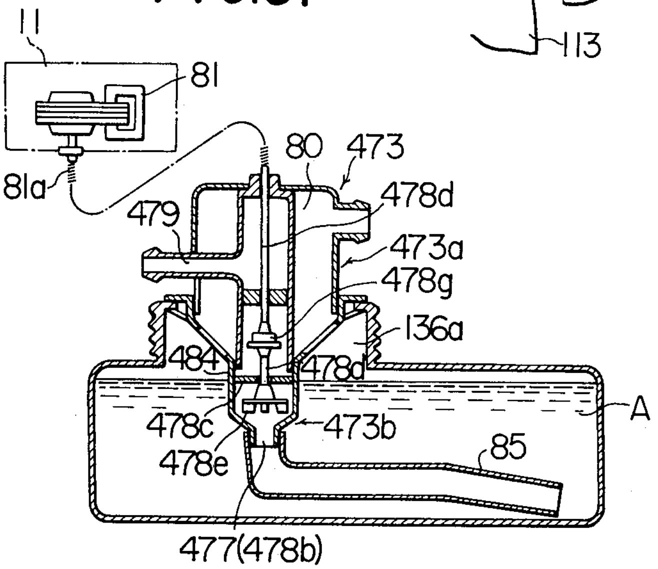
Figure 36:
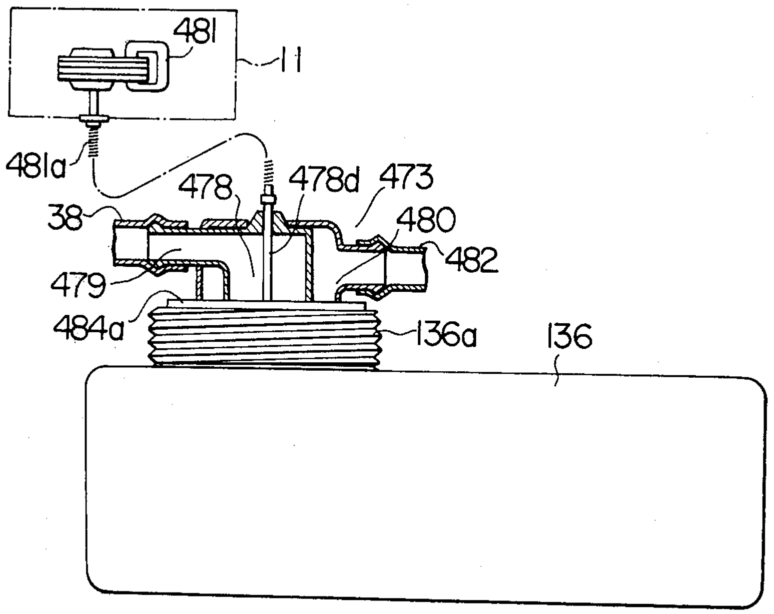

FIGS 36 and 37 each are schematic cross sections of different developer pumps with developer flow routes.

Figure 38:
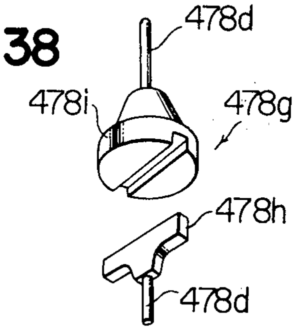

FIG. 38 is a perspective view of a joint device that can be used in the developer pumps with the developer flow routes in the invention.

DETAILED DESCRIPTION OF THE PREFERRED EMBODIMENTS

Referring to FIG. 3 through FIG. 10, an embodiment of a guide apparatus according to the invention, which has a guide member for guiding a movable contact glass in an exposure apparatus of an electrophotographic copying machine, will now be explained.

Before explaining the guide apparatus, an example of an electrophotographic copying machine to which the guide apparatus can be applied will be explained by referring to FIG. 3.

Figure 3:
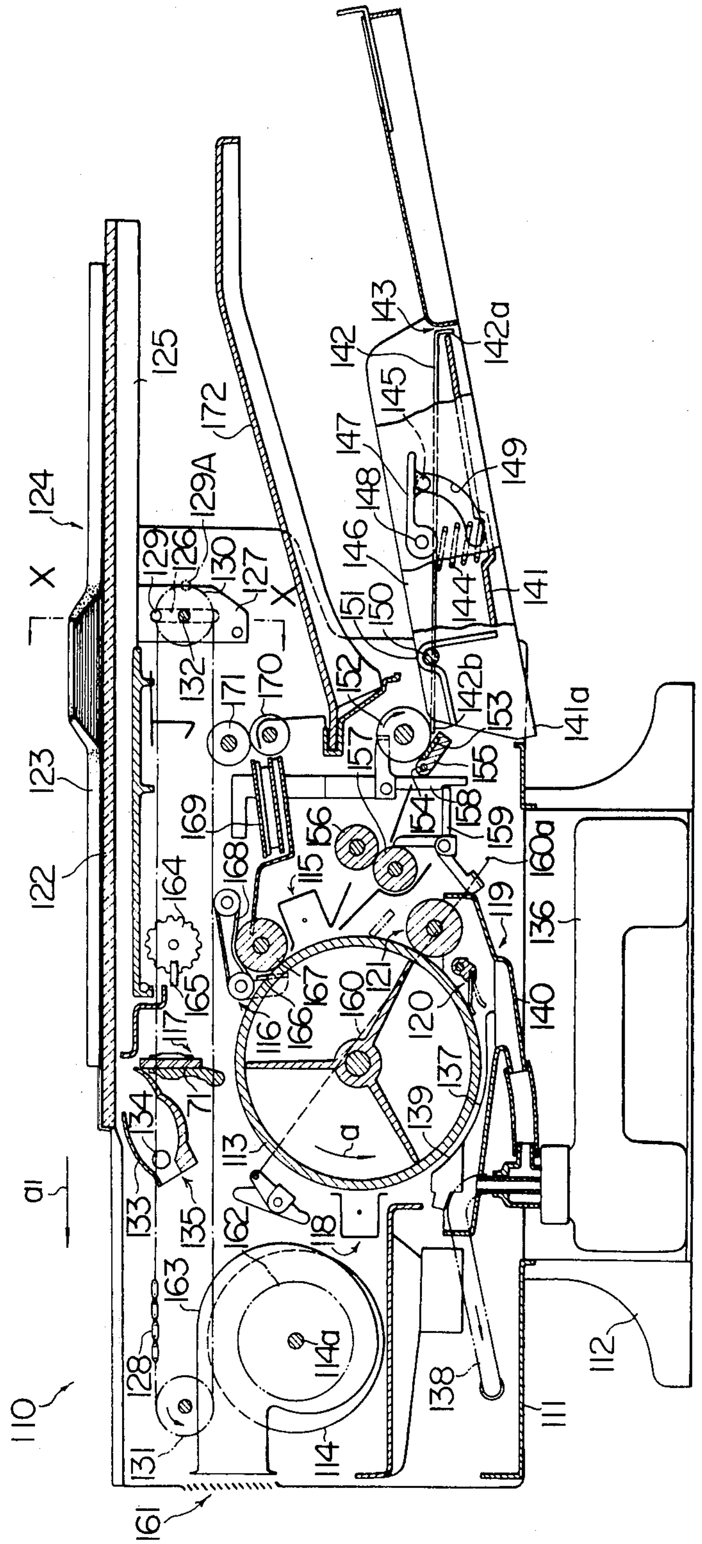
FIG. 3 shows schematically a central cross section of an electrophotographic copying machine to which the invention can be applied.

In FIG. 3, there is schematically shown a cross section of the electrophotographic copying machine which is represented by reference numeral 110 as a whole. In FIG. 3, a base plate 111 is fixed to a hollow stand 112. A photoconductor drum 113 having a photoconductive layer on its peripheral surface, which is situated above the stand 112, is driven in the direction of arrow a by a drive motor 114 through a rotation transmission apparatus, for example, through a chain sprocket apparatus.

Around the photoconductor drum 113, there are arranged in the following order a charger 115 for forming latent electrostatic images and for transferring developed images; a transfer sheet separation apparatus 116 for separating a transfer sheet from the surface of the photoconductor drum 113 and guiding the transfer sheet in a predetermined direction; an exposure apparatus 117 (trade name: Selfoc) comprising a light condensing optical element array 71; a quenching charger 118; a development apparatus 119 using a liquid developer; a cleaning blade 120 whose free end is detachable from the surface of the photoconductor drum 113; and a squeeze roller 121 for regulating a liquid developer layer formed on the surface of the photoconductor drum 113, after it passes through the development apparatus 119, to a predetermined thickness.

On an upper surface of the copying machine, there is supported a contact glass 124 comprising a transparent plate 122 and a pressure plate 123 which can be opened and closed, which constitute part of the exposure apparatus 117, in such a manner that the contact glass 124 is slidable to the left and to the right. On the right side edge of the contact glass 124, when FIG. 3 is viewed from the right side, a thin holding member 125 made of glass is fixed along the side edge. An upper edge of a bracket 127 having a slot 126 extending vertically is fixed to a central portion of the holding member 125. A pin 129 which is fixed to part of a loop chain 128 is loosely fitted into the slot 126. The loop chain 128 is trained over a pair of sprockets 130, 131, which are disposed at the same level as that of the loop chain 128.

One sprocket 131 is connected to the motor 114 through an appropriate clutch, so that the sprocket 131 can be driven in the direction of the arrow during the copying process. The contact glass 124, which is connected to the loop chain 128 through the pin 129, is reciprocated one time from the rightmost position as shown in FIG. 3, during one revolution of the pin 129 together with the loop chain 128.

When the pin 129 is positioned right under a shaft 132 of the sprocket 130, the contact glass 124 is at a position for this start of copying; to be more exact, at a position immediately before the initiation of the exposure step. The actual starting position of the contact glass 124 is a position where the pin 129 occupies a dead point on the right side of the shaft 132, namely a position 129A indicated by the short-dash line.

In FIG. 3, on the left side of the exposure apparatus 117, there is disposed a reflector 133 whose cross section is elliptic, having an opened portion, and an original document illumination apparatus 135 comprising a rod-like lamp 134 which is disposed so as to transverse the contact glass 124.

Within the stand 112, there is a box-like liquid developer contrainer 136, which can be inserted and taken out from the front of the copying machine. The liquid developer container 136 is connected to a development electrode 137 which is disposed under the photoconductor drum 113, through a liquid developer supply pipe 138. By a pump disposed at a suitable position in the liquid developer supply pipe 138, the liquid developer is supplied into a liquid developer inlet 139 formed at one end of the development electrode 137 from the liquid developer container 136. The supplied liquid developer flows along the development electrode 137, while filling the gap between the photoconductor drum 113 and the development electrode 137. The liquid developer is then poured on a developer receptacle 140 from the other end of the development electrode 137, so that the liquid developer is returned to the liquid developer container 136.

Transfer sheets are stacked on a movable plate 142 of a transfer sheet table 141 which extends from a lower portion of a right side wall of the copying machine. A rear edge 142*a* of the movable plate 142 is bent downwards and engages loosely with a slot 143 of the transfer sheet table 141. The movable plate 142 is urged to rotate about the rear edge 142*a* in the direction for pushing transfer sheets upwards by the resilience of a compression spring 144 equipped between the transfer sheet table 141 and the movable plate 142. The movement of the urged movable table 142 is restricted since a top edge 142*b* of the movable plate 142 is in contact with a sheet feeding roller 152. A pin 145 for pushing the movable plate 142 downwards is secured to part of a lever 147 which is attached to a side wall 146 of the transfer sheet table 141 through a shaft 148. The swingable range of the lever 147 about the shaft 148 is determined by an arctuate slot 149 formed in the side wall 146. By turning the lever 147 clockwise, the movable plate 142 can be pushed downwards against the resilience of the spring 144 through the pin 145 and a transfer sheet can be placed on the movable plate 142 when the movable plate 142 is pushed downwards. The transfer sheet table 141 is detachably disposed by causing a top edge portion 114*a* of the transfer sheet table 141 and an engagement portion 151 formed in the side wall 146 to engage with a pin 150 secured to the base plate 111 of the copying machine.

The top edge portion 142*b* of the movable plate 142 is in light pressure contact with a lower portion of the sheet feeding roller 152 when the movable plate occupies a lifted position. A friction member 153 is in pressure contact with another lower portion of the sheet feeding roller 152. The friction member 153 is bonded to an arm 155 which is pivotally mounted on a shaft 154. The friction member 153 is brought into pressure contact with the peripheral surface of the sheet feeding roller 152 by a spring (not shown) which acts on the arm 155. The friction member 153 serves to feed transfer sheets individually between a pair of registration rollers 156, 157 from a stack of sheets placed on the transfer sheet table 141 in collaboration with the sheet feeding roller 152. For example, when two transfer sheets happen to be fed between the sheet feeding roller 152 and the friction member 153, the second transfer sheet is prevented from advancing any further by the friction member 153, so that only the first transfer sheet is fed by the sheet feeding roller 152. Individual sheet feeding can be attained by selecting the friction member 153, the transfer sheets and the sheet feeding roller 152 so as to satisfy a relationship of $\mu_3 > \mu_1 > \mu_2$, where $\mu_1$ is the coefficient of friction between the friction member 153 and the transfer sheet, $\mu_2$ is the coefficient of friction between the transfer sheets, and $\mu_3$ is the coefficient of friction between the sheet feeding roller 152 and the transfer sheet. The registration rollers 156, 157 have a function of feeding the transfer sheet fed by the sheet feeding roller 152 towards the charger 115 in such a manner that the leading edge of the transfer sheet is in conformity with the leading edge of the developed image on the surface of the photoconductor drum 113. The sheet feeding operation is performed by the cooperation of the sheet feeding roller 152 and the registration rollers 156, 157. On the other hand, the the cooperative rotation and stopping of the sheet feeding roller 152 and the registration rollers 156, 157 are controlled by link mechanisms 158, 159 disposed between the sheet feeding roller 152 and the registration rollers 156, 157. The link 158 works with a clutch mechanism for controlling the rotation and stopping of the sheet feeding roller 152, while the link 159 works with a clutch mechanism for controlling the rotation and stopping of the registration roller 157. The link 159 is connected to one end 160*a* of an operation command link 160 for actuating the registration roller 157 for transfer sheet feeding when the image area on the photoconductor drum 113 reaches a predetermined rotating position.

In FIG. 3, in part of the side wall on the left side of the copying machine, there is formed an exhaust hole 161, to which is connected an exhaust system comprising a fan 162 fixed to a shaft 114*a* of the motor 114 and a casing 163 for the fan 162.

In the above-mentioned copying machine, one copy is made by two revolutions of the photoconductor drum 113.

During the first revolution of the photoconductor drum 113, the following operations are performed.

(1) Overall uniform charging of the surface of the drum 113 by the charger 115

(2) Slit exposure by the exposure apparatus 117

(3) Development of a latent electrostatic image by the development apparatus 119

(4) Formation of a liquid developer layer with a predetermined thickness on the surface of the drum 113 by the squeeze roller 121

During the second revolution of the drum 113, the following operations are performed:

(5) Transfer of the visible developed image to a transfer sheet by the charger 115

(6) Separation of the transfer sheet from the drum 113 by the transfer sheet separation apparatus 116

(7) Quenching of charges on the drum 113 by the quenching charger 118

(8) Cleaning of the surface of the drum 113 by the cleaning blade 120

During the first revolution of the drum 113, the quenching charger 118 is deenergized and the cleaning blade 120 is detached from the surface of the drum 113.

The drum 113 begins to be rotated upon depressing a main switch of the copying machine, while the contact glass 124 is moved to the left from the position where the pin 129 occupies the position 129A indicated by the short-dash line, upon depressing a print button, at a speed in synchronization with the rotation of the drum 113, so that the image of the original document is projected on the surface of the drum 113 through the exposure apparatus 117.

The transfer sheet fed by the registration rollers 156, 157 is brought into contact with the drum 113, while several millimeters of one side edge of the transfer sheet protrude from the drum 113. When the transfer sheet has passed through the charger 115, the protruding leading edge of the transfer sheet is picked up by a guide portion 166 of the transfer sheet separation apparatus 116, and, with a further advancement of the transfer sheet, the protruding portion of the transfer sheet is held between turn rollers 167, 168, whereby the transfer sheet is separated from the photoconductor drum 113. The separated transfer sheet is caused to pass over a guide plate 169 and is then discharged onto a sheet discharge table 172 by a pair of sheet discharge rollers 170, 171.

A pulse generation apparatus comprising a rotation disc 164 with notches and a photoelectric conversion device 165, which is situated above the transfer sheet separation apparatus 116, generates electric signals sequentially for controlling the sequential operations required for the copying machine.

Conventionally, in a small size electrophotographic copying machine of the above-mentioned type to which the invention can be applied, there is a limit to the length of the guide apparatus for the contact glass of the copying machine due to the desire of making the copying machine as small in size as possible. Therefore, it has a shortcoming that the center of gravity of the contact glass is moved beyond the guide apparatus when the contact glass is reciprocated, so that one side portion of the contact glass is moved upwards with a deviation from the predetermined position. According to the invention, such a shortcoming is eliminated from the copying machine and, at the the same time, making the copying machine compact in size is facilitated.

Figure 1A:
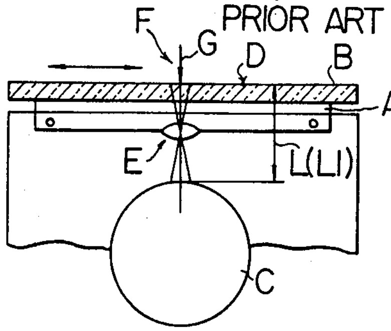
FIG. 1(a) PRIOR ART
FIGS. 1(*a*), 1(*b*) and 1(*c*) diagrammatically show the operation of a conventional guide apparatus for reciprocating a movable contact glass slidably in an electrophotographic copying machine.
Figure 1B:
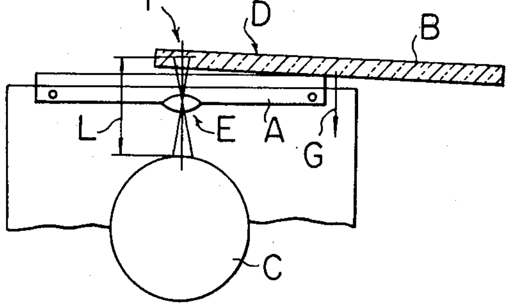
FIG. 1(b) PRIOR ART
Figure 1C:
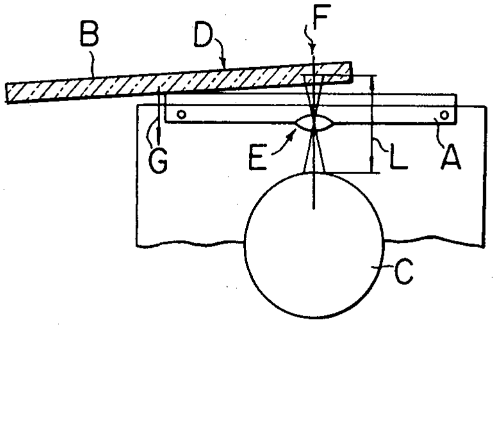
FIG. 1(c) PRIOR ART

In the invention, in order to prevent the contact glass from moving upwards at the exposure position F when the center of gravity of the contact glass moves, the opposite end portions of the guide members are lowered, so that the difficulty in keeping the optical path $L_1$ (FIGS. 1(*a*) to 1(*c*)) constant is eliminated. The original document stacking surface D which successively reaches the exposure position E is always set in conformity with a predetermined optical path or conjugate optical path L between the original document stacking surface D and an image formation member, whereby defocusing of the image is prevented.

Figure 4:
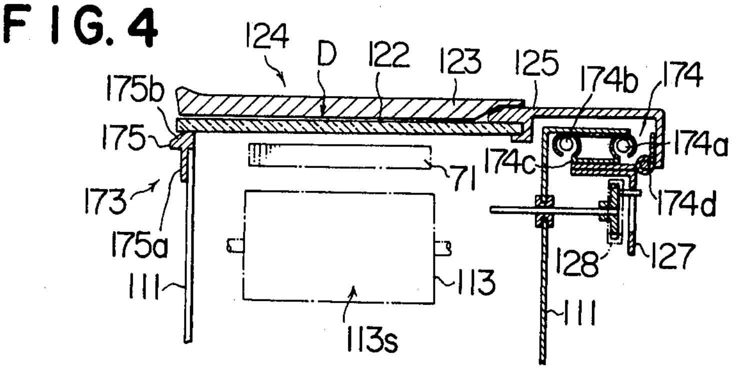
FIG. 4 is a cross section taken on line X—X in FIG. 3.

As shown in FIG. 4, a guide apparatus 173 supports the opposite side edges of the contact glass 124. One side of the guide apparatus 173 comprises an accurate rail 174 (trade name: Accuride) and the other side of the guide apparatus 173 comprises a guide member 175 capable of supporting the transparent plate 122 slidably and detachably. In the accurate rail 174, a straight guide rail 174*a* is fixed to the base plate 111, and to the guide rail 174*a* there is attached a slider 174*c* through a steel ball bearing train consisting of a number of steel ball bearings 174*b*. To the slider 174*c*, there is connected the thin holding member 125 made of glass through a hinge 174*d*. The holding member 125 is designed so as to be movable in the exposure scanning direction by the chain loop 128 through the bracket 127. The accurate rail 174 is constructed in such a manner that, when the slider 174*c* is moved along the guide rail 174*a*, the steel ball bearings train is moved in the same direction half the distance of the movement of the slider 174*c*. Therefore, when the movement distance of the contact glass 124 and the whole length of the guide rail 174*a* are almost equal to the whole length of the contact glass 124, as in the embodiment shown in FIGS. 4 and 5, it is almost impossible to support the center of gravity G of the contact glass 124 above the steel ball bearing train if its length is finite. Therefore, it may occur that the contact glass 124 is slanted corresponding to the clearance between the guide rail 174*a* and the steel ball bearings 174*b*, when its center of gravity G is deviated from the steel ball bearing train at the initiation or termination of exposure scanning.

Figure 5:
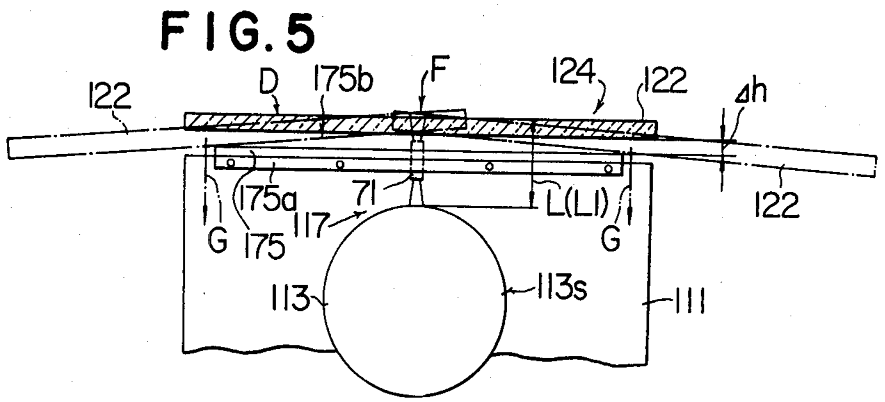
FIG. 5 is a diagrammatical cross section of an embodiment of a guide apparatus according to the invention.

The other guide member 175 is fixed to the base plate 111, together its fixing portion 175*a*. Above the fixing portion 175*a*, there is formed an upper surface 175*b* for guiding the contact glass 124. Like the guide rail 174*a*, the guide member 175 is almost the same in length as the whole length of the contact glass. As shown in FIG. 5, an upper surface 175*b* of a guide member 175 is slanted in the opposite directions from the exposure position F. To be more specific, the upper surface 175*b* at the opposite end portions of the guide member 175 is Δh lower than the upper surface 175*b* at the exposure position F. The upper surface 175*b* of the guide member 175 is almost flat at the exposure position F. Therefore, the original document stacking surface D of the transparent plate 122 which is slidably in contact with the upper surface 175*b* is positioned Δh higher at the exposure position F than at the opposite end positions of the guide member 175. In other words, when the transparent plate 122 of the contact glass 124 is at the right end, the center of gravity of the transparent plate 122 is deviated from the upper surface 175*b*, so that the transparent plate 122 is slanted to the right, but the original document stacking surface D at the exposure position F is Δh higher than at the end position. In this case, the holding member 125 which is held on the accurate rail 174 allows the transparent plate 122 to slant, due to some play or flexibility of the steel ball bearings 174*b* and the slider 174*c* with respect to the guide rail 174*a*. When the transparent plate 122 is moved slidably to the left by the chain loop 128 through the bracket 127, the transparent plate 122 gradually becomes horizontal and when the center of gravity G of the transparent plate 122 comes at or near the exposure position F, the original document stacking D is held horizontally. When the transparent plate 122 slides further to the left, the left side of the original document stacking surface D is lowered. While the above-mentioned operation is being performed, the image of the original document, coming successively to the exposure position F, is projected to a photoconductive surface of the drum 113 through the light condensation element array (image formation element) 71 so that a latent electrostatic image corresponding to the image of the original document is formed on the drum 113. In this case, by setting the actual optical path $L_1$ between the original document stacking surface D and the photoconductive surface 113*s* in conformity with the conjugate optical path L which is determined by the light condensation transmission element array 71, the latent electrostatic image can be formed accurately on the photoconductive surface 113*s*.

The shape of the above-mentioned exposure apparatus 117 comprising the original stacking surface D, the photoconductive surface 113*s* of the drum 113 and the image formation element 71 is determined mainly by the shape of the image formation element 71. In other words, the contact glass 124 is extended equally to the opposite sides from the image formation element 71, and in order to make the copying machine compact in size, if the image formation element 71 is disposed above the photoconductor drum 113, the guide apparatus 173 is constructed so as to be almost equal in length of the whole length of the contact glass 124, by extending an equal minimum length from the image formation element 71, whereby the guide apparatus 173 can be minimized in size. In this case, however, the center of gravity of the contact glass 124 deviates from any of the opposite ends of the guide apparatus 173 at the initiation or termination of the exposure scanning, so that if the contact glass 124 is simply mounted on the upper surface 36*b*, the contact glass 124 deviates upwards at the exposure position F. However, in the invention, there is disposed a guide member capable of supporting the original document stacking surface D, always at the exposure position F at a position determined by the predetermined optical length L. In other words, the upper surface 36*b* of the guide member 175 is formed in a shape such that the opposite end portions of the guide member 175 are lowered by a predetermined distance Δh in comparison with the upper surface 175*b* at the exposure position F, that is, in a shape of a chevron. Therefore, if the center of gravity G of the contact glass 124 is deviated from the guide member 175, the upward shift Δh of the original document stacking surface D is cancelled, so that clear images are always formed, and therefore, when the invention is employed in the copying machine, clear copies are always obtained. When a light condensing optical element array is employed as the image formation element 71, the effect of the invention is significant since the depth of focus of a light condensing optical element array is small.

Figure 6:
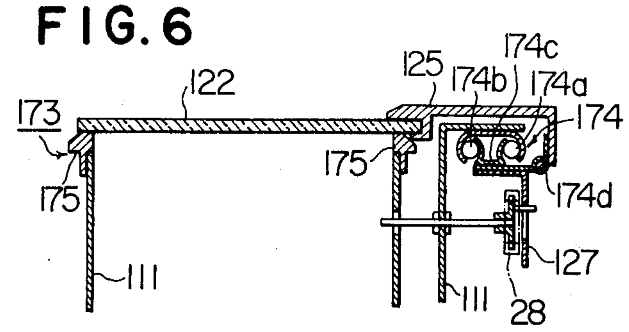
FIG. 6 is a diagrammatical cross section of another embodiment of a guide apparatus according to the invention.

The guide apparatus 173 comprises the accurate rail 174 on one side and the guide member 36 on the other side, so that the optical path $L_1$ between the original document stacking surface D at the exposure position F and the photoconductive surface 113*s* is always set in conformity with the conjugate optical path L of the image formation element 71. So long as the above condition is satisfied, the guide apparatus 173 can be modified. For example, the guide member 175 which is employed in the embodiment shown in FIG. 5 can be disposed near the accurate rail 174 as shown in FIG. 6, whereby the transparent plate 122 can be reciprocated in a more stable manner.

Figure 7:
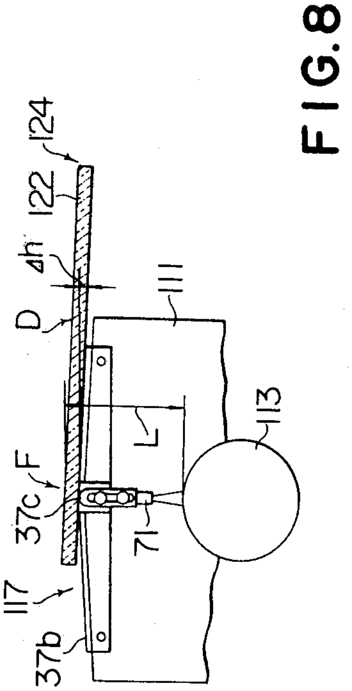
FIG. 7 is a diagrammatical cross section of a further embodiment of the invention.

Referring to FIG. 7, a further embodiment of a guide apparatus according to the invention will now be explained. In this embodiment, the upper surface 37*b* of the guide member 37 is lowered a predetermined height Δh in the opposite side portions of the upper surface 37*b* in comparison with the central portion of the upper surface. Furthermore, a projection 37*c*, whose fine adjustment can be performed with respect to its vertical position, is disposed at the exposure position F any by adjusting the position of the projection 37*c*, the position of the original document stacking surface D can be simply adjusted in accordance with a predetermined optical path L. In that case, if the light condensing phototransmitter element array 71 is connected to the projection 37*c* so as to be movable integrally with the projection 37*c*, their attachment will be much simpler. In the course of the movement of the transparent plate 122 of the contact glass 124, the posture of the transparent plate 122 changes from a left-side lowered posture to a right-side lowered posture. However, since the top portion of the projection 37*c* is sharper than the top portion of the upper surface 37*b* at the exposure position F, the transparent plate 122 changes its posture from the left-side lowered posture to the right-side lowered posture, without a transient horizontal state in between. Therefore, the contact glass 124 is nearly in point contact with the projection 37*c*, so that top portion of the projection 37*c* may be gradually abraded, and the optical path L may gradually be changed. Therefore, it is preferable that the radius of curvature of the top portion of the projection 37*c* be as small as possible within a range that the projection 37*c* is sufficiently resistant to abrasion. In that sense, it is preferable that the projection 37*c* be a roller member.

Figure 8:
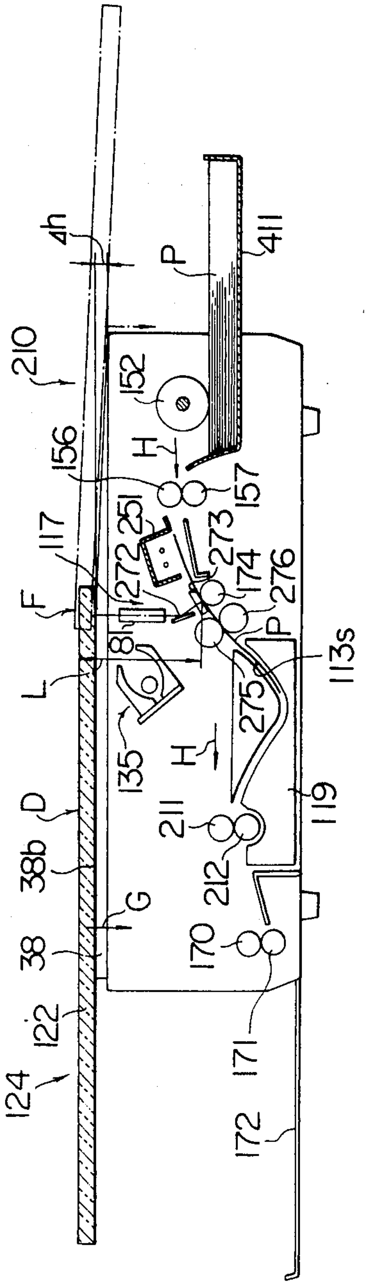
FIG. 8 is a diagrammatical cross section of an electrophotographic copying machine to which a still further embodiment of the invention is applied.

In an electrophotographic copying machine represented by reference numeral 210 shown in FIG. 8, the exposure position F is shifted to the right side in comparison with the exposure position F of the electrophotographic copying machine shown in FIG. 3. As in the electrophotographic copying machine shown in FIG. 3, a light condensing optical element array is employed as the image formation element 71 in the copying machine 210. However, the copying machine 210 is different from the copying machine 110 shown in FIG. 3 in that a photoconductive surface 113*p* is formed on a photosensitive sheet P, and in that the copying machine 210 is of the so-called electrofax type. Therefore, there is some freedom in setting the exposure position F in the copying machine 210. On the right side of the copying machine 210 in FIG. 8, there is disposed a photosensitive sheet table 411 for stacking the photosensitive sheets P thereon. Above the photosensitive sheet table 411, there is situated the sheet feeding roller 152 for feeding the sheets P individually in the direction of the arrow H. The sheet feeding roller 152 is rotatably supported on a shaft (not shown). The photosensitive sheets P are individually fed between the registration rollers 156, 157 by the sheet feeding roller 152 and are then transported towards the exposure position F, in the direction of the arrow H, passing through a charging section 251, in synchronization with the movement of the original document stacking surface D of the contact glass 124. The exposure apparatus 117 comprises the light condensing phototransmitter element array 71 for forming a light image at a predetermined image formation position by a scanning light reflected from the original document stacking surface D by the original document illumination apparatus 135; a reflector 272 capable of reflecting the scanning light and projecting an erect image to the photosensitive surface 113*p* corresponding to the image of the original document; and a glass plate 273 which allows the light reflected from the reflector 272 to pass therethrough and on a lower surface of which the scanning light form the original document stacking surface D forms the image. In FIG. 8, reference numeral 274 represents a roller which can be brought into contact with the lower surface of the glass plate 273. Reference numerals 275, 276 represent a pair of guide rollers for guiding the photosensitive sheets P individually into a development apparatus 19. The electrically charged photosensitive surface 113*p* passes over the lower surface of the glass plate 273 and a latent electrostatic image is formed on the photosensitive surface 113*p* at the lower surface of the glass plate 273. The photosensitive sheet P is further transported in the direction of the arrow H and the latent electrostatic image is made visible in the development apparatus 19. The residual liquid developer is removed from the photosensitive sheet p by a pair of squeeze rollers 211, 212 and the photosensitive sheet P is discharged onto the sheet discharge table 172. As mentioned previously, in this copying machine, the exposure position F is shifted to the right in FIG. 8. This is because the space for the charging section 251, the registration rollers 156, 157 and the photosensitive sheet table 411 is smaller than the space for the development apparatus 19 and the squeeze rollers 211, 212. In a guide apparatus of this copying machine, an upper surface 38*b* of a guide member 38 on the left side of the exposure position F is flat, while its right side upper surface 38*b* slants so as to be lower in the direction of its right end. In other words, the transparent plate 122 indicated by the solid line is positioned in its original position before the exposure scanning is initiated. In this position, the center of gravity of the contact glass 124 is positioned above the flat portion of the upper surface 38*b*. When the contact glass 124 slides along the flat upper surface 38*b* while its center of gravity G is positioned over the flat upper surface 38*b*, the contact glass 124 does not move upwards from the exposure position F. When the center of gravity G of the contact glass is shifted over to the slanted upper surface 38*b* with a further sliding of the contact glass 124, the contact glass 124 slides along the slanted upper surface 38*b*, so that the center of gravity G of the contact glass is lowered from the exposure portion F, coming to the position indicated by the alternated long and short dash line. Thus, one scanning is completed. Then, the contact glass 124 returns to its original position shown by the solid line, so that one copying cycle is finished. When the contact glass 124 is in a position indicated by the alternated long and short dash line, the center of gravity G of the contact glass 124 is Δh lower than the plane of the exposure position F and is also shifted from the upper surface 38*b*. Therefore, it appears that the left side of the contact glass 124 tends to move upwards. However, since the center of gravity G of the contact glass 124 itself is lowered by Δh when the contact glass 124 is in the position indicated by the alternated long and short dash line, the original document stacking surface D at the exposure position F is supported at the predetermined optical path L. Thus, in the invention, the upper surface 38*b* of the guide member 38 is formed so as to slant lower in the direction for the center of gravity G of the contact glass 124 deviates from the guide member 38 due to the shifted exposure position F in FIG. 8, and by such a simple construction, a remarkable effect is achieved. Furthermore, in the copying machine shown in FIG. 8, the left side of the upper surface 38*b* of the guide member 38 can be formed so as to slant continuously from the right side, without making the left side horizontal as mentioned above.

In the above-mentioned embodiments of the guide apparatus according to the invention, as the image formation element 71, the light condensing optical element array is employed. However, the image formation element 71 is not limited to this, but any image formation lens (not shown) can be employed as the image formation element 71. When the image formation lens is employed, the predetermined optical path L is the distance between the original document stacking surface D and the focusing surface of the lens, that is, its image formation position. The optical path L depends upon the focal length of the image formation element 71 and a selected copy magnification. Therefore, when a copy magnification apparatus (not shown) is incorporated in the copying machine 210 and the optical path L to be set differs, depending upon unit-magnification and other magnification, each optical path L has to be kept constant in each scanning step.

Figure 10:
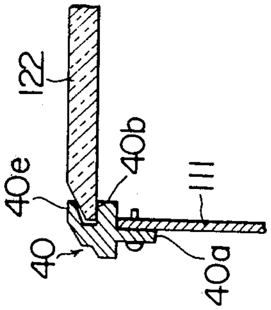
FIGS. 9 and 10 each show a modification of the guide members for use in the guide apparatus of FIGS. 5, 7 and 8.
Figure 9:
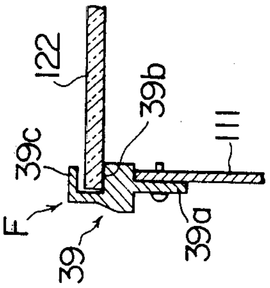

Since part of the transparent plate 122 has to be always in contact with the guide member 38 at the exposure position F, it should not occur that the transparent plate 122 is moved away from the exposure position F. Therefore, when the center of gravity G of the contact glass 124 deviates from the guide member 38 and great force is applied to the contact glass 124 to turn the same, for instance, when the original document placed on the contact glass 124 is very heavy or when necessary for some other reasons, a guide member 38 having a jaw 39*c* as shown in FIG. 9 is helpful to prevent the turning of the contact glass 124. Furthermore, as shown in FIG. 10, by forming a jaw 40*e* so as to be engageable with a slanting portion 122*a* of the transparent plate 122, the original can be set on the plate 122, without being caught by the jaw 40*e*.

In the above-mentioned embodiments of the guide apparatus according to the invention, the contact glass is simply mounted on the guide member so as to be capable of sliding reciprocatingly along the guide member. However, the invention can be applied to an ordinary guide apparatus comprising accurate rails, in which some upward movement of the contact glass may become a problem due to a gap between the contact glass and the accurate rails.

According to the invention, such an inconvenience is prevented as that the original document stacking surface D deviates from a predetermined level in conformity with the predetermined optical path L of the exposure apparatus 117 due to the upward movement of the original document stacking surface D when the center of gravity G of the contact glass 124 deviates from above the guide member. Therefore, according to the invention, clear copies of the image of the original document, without any blur, can always be obtained and the copying machine can be made more compact in size.

Figure 11:
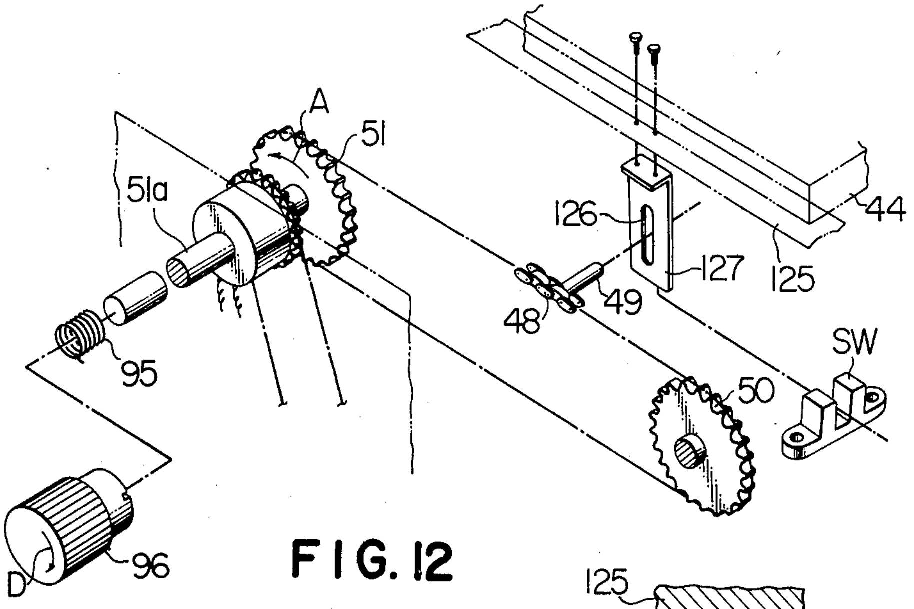
FIG. 11 schematically shows the main portion of a lock release apparatus for use with a contact glass in the invention.

Referring to FIG. 11, there is shown the main portion of a lock release apparatus for use with a contact glass 44 in the invention.

A sprocket 51 is supported on one end portion of a shaft 51*a*. On the other end portion of the shaft 51*a*, there is mounted a release knob 96, which is extended to an operable position, through a spring clutch 95.

The spring clutch 95 is fitted on the shaft 51*a*, while one end of the spring clutch 95 is fixed to the release knob 96, so that when the sprocket 91 is rotated in the direction opposite to its normal direction (indicated by the arrow A) by the release knob 96, the rotation of the release knob 96 is transmitted to the shaft 51*a* by the fastening function of the spring clutch 95.

The reason for setting the rotating direction of the release knob 96 in the direction opposite to the normal direction is to cause the contact glass to return directly to its start position automatically, taking its backward path without taking its forward path, when the contact glass 44 is not at its start position and a main switch (not shown) for driving the contact glass 44 is depressed. Otherwise, in a system in which the driving sequence of the contact glass 44 is controlled when it is in the forward path, the contact glass 44 has to take its forward path, starting from its previous release position, so that an unnecessary imperfect copy may be made.

Figure 12:
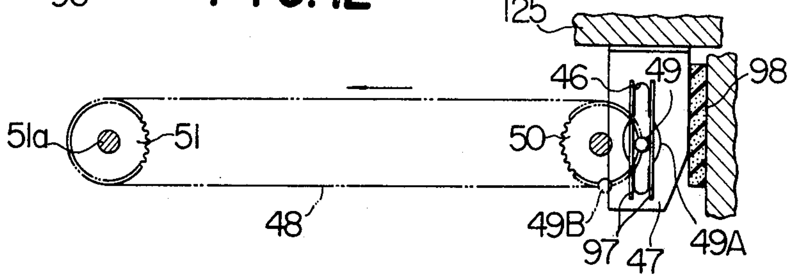
FIG. 12 schematically shows a shock absorbing apparatus for use with a contact glass in the invention.
Figure 13:
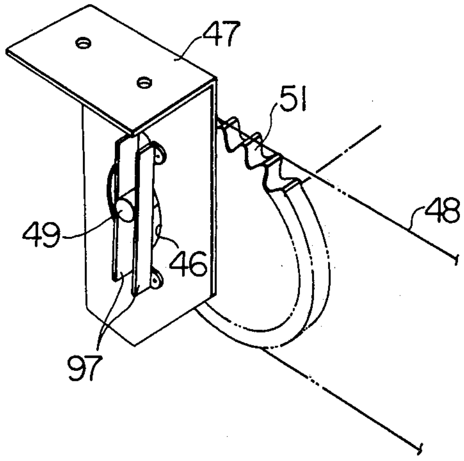
FIG. 13 is a perspective view of part of the shock absorbing apparatus of FIG. 12.

When the sprocket 51 is rotated by the release knob 96, a pin 48 fixed to a loop chain 48 is moved clockwise from its dead point 49A (FIG. 12).

When the pin 49 has passed over the dead point 49A, nothing comes to prevent the contact glass from moving horizontally, so that it becomes possible to move the contact glass 44 manually.

Referring to FIG. 12, in a bracket 47 having a slot 46 with which the pin 49 fixed to the loop chain 48 engages, the slot 46 has a concave portion which is wider than its opposite ends, at a dead point of the pin 49, unlike a slot 126 having the same width (FIG. 11). As is shown more clearly, to the opposite side edges of the slot 46, there are disposed a pair of plate springs 97 with a space in which the pin 49 is slidable.

The plate spring 97 and the slot 49 are formed in the shapes capable of preventing the breakdown of the pin 49 when the contact glass 44 is returned manually at a great speed and the load applied to the pin 49 increases when the pin 49 is at the above-mentioned dead point 49A.

More specifically, when the contact glass 44 is returned speedily, the plate spring 97 are bent by the inertia of the contact glass 44. As a result, the inertia applied to the pin 49 is absorbed by the plate springs 97. Furthermore, when the inertia of the contact glass 44 cannot be absorbed completely only by the plate springs 97, the plate springs 97 are bent and, at the same time, the inertia is converted to the force for moving the bracket 47 beyond the pitch circle of the sprocket 50, whereby the load applied to the pin 49 can be reduced. In this case, a shock absorbing member 98 is fixed to the body of the copying machine and the bracket 47 is caused to collide with the shock absorbing member 98 to reduce the load applied to the pin 49.

Figure 14:
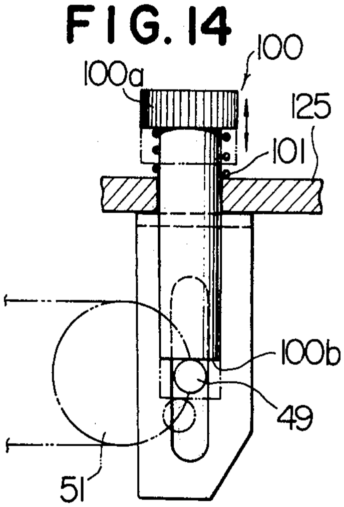
FIG. 14 is an enlarged view of a lock releasing section for use in the invention.

In the above-mentioned lock release apparatus, the pin 49 is moved away from the dead point 49A by rotating the sprockets 50, 51 through the lock release knob 96, but it is possible to move the pin 49 directly away from the dead point 49A, without through the lock release knob 96. When the pin 49 is moved directly, such an apparatus as shown in FIG. 14 is used, which has a pressure rod 100 supported by a spring 101 so as to be moved vertically, and a release knob 100*a* and in which when the pressure rod 100 is depressed, its top portion 100*b* pushes the pin 49 downwards so as to be moved away from the dead point 49A. The pin 49 can also be moved away from the dead point 49A by rotating a lever projected from the shaft of the sprocket.

Figure 15:
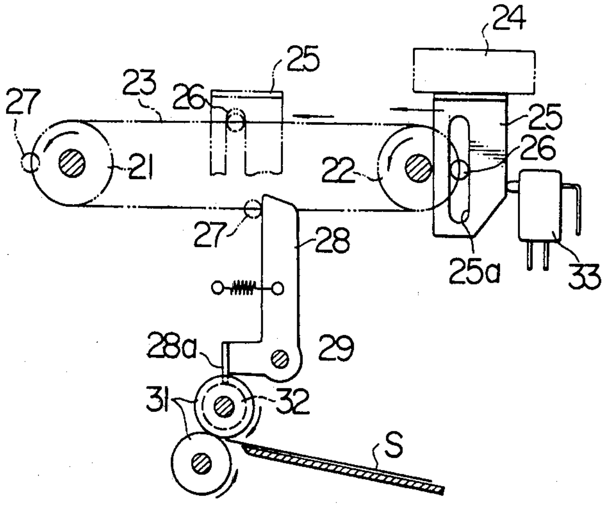
FIG. 15 shows schematically an embodiment of a drive apparatus for driving a movable member, such as a contact glass or an optical system, according to the invention.
Figure 16:
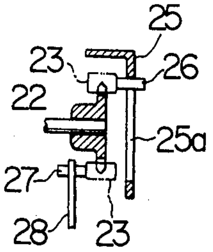
FIG. 16 is a cross section of the main portion of the drive apparatus of FIG. 15.

Referring to FIGS. 15 and 16, a further drive apparatus for driving a movable member such as a contact glass or an optical system in an electrophotographic copying machine will now be explained.

In FIG. 15, to a chain 23 trained over sprockets 21, 22, there are attached a movable member 24; a pin 26 for moving a bracket 25; and a pin 27 actuating a control member 28. The pin 26 is fitted into a slot 25*a* formed in the bracket 25.

As shown in FIG. 16, the pins 26, 27 are extended to a different direction from each other. When the sprocket 21 on the driving side rotates in the direction of the arrow, with a clutch disposed coaxially with the sprocket 21 being energized, the chain 23 is rotated in the same direction, so that the bracket 25 is moved forward in the direction of the arrow from its start position.

In the meantime, the pin 27 reaches a position indicated by the imaginary line in accordance with the rotation of the chain 23 and then kicks the control member 28. As a result, the control member 28 is turned clockwise about a shaft 29, whereby a stop pawl 28*a* of the control member 28 releases a one-way clutch 32, such as a spring clutch, and a pair of sheet feeding rollers 31 are rotated in the directions of the respective arrows. Then, a copy sheet S, which has been in a waiting position, is transported between the sheet feeding rollers 31.

After the control member 28 is operated by the pin 27 in the above-mentioned manner, the pin 27 returns to the right end. The pin 26 for moving the bracket 25 also returns to the right end. A switch 33 shown in FIG. 15 is for detecting the start position of the bracket 25 and stopping the bracket 25 at its start position.

Figure 2:
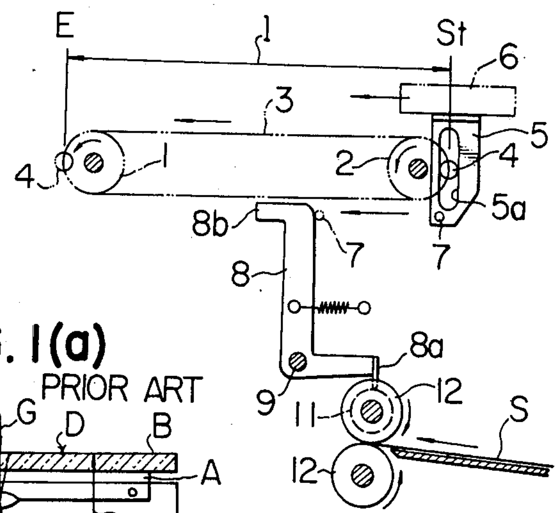
FIG. 2 PRIOR ART
FIG. 2 shows diagrammatically a conventional drive apparatus for driving a movable member, such as a contact glass or an optical system, in an electrophotographic copying machine.

In this drive apparatus, the movable member 25 linearly is reciprocated and the pin 27 operates the control member 28 one time during each revolution of the chain 23. In other words, the pin 27 for operating the control member 28 takes two different routes in height when it is moved together with the chain 23. Therefore, unlike the previously mentioned conventional apparatus, means for retracting the control member 28 is not required. More specifically, in the conventional drive apparatus as shown in FIG. 2, since the pin 7 for operating the control member 8 is attached to the bracket 5, the pin 7 takes the same and linear path and therefore, means for retracting the control member 8 is required for allowing the bracket 5 to return to its start position.

When it is desired to release the pin 26 from its dead point, the previously mentioned lock release apparatus can be employed in this drive apparatus.

When the movable member 24 is moved manually after the pin 26 is released from its dead point, the chain 23 is rotated in the direction of the arrow. When the pin 26 reaches the left end, the movable member 24 does not move any further. In the meantime, the pin 26 does not do anything to the control member 28, while the pin 27 is moved via the upper path of the chain 23, coming to the position of the pin 26 indicated by the solid line, without operating the control member 28. Therefore, when the movable member 24 is moved manually, it could not happen that the controlled system such as the sheet feeding rollers 31 is erroneously operated.

Figure 17:
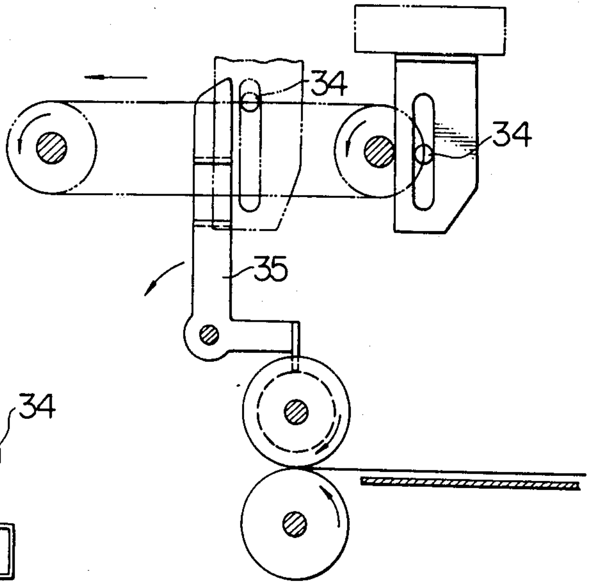
FIG. 17 shows schematically another embodiment of a drive apparatus according to the invention.
Figure 18:
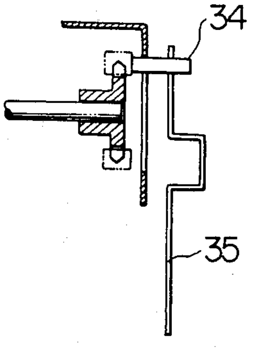
FIG. 18 is a cross section of the main portion of the drive apparatus of FIG. 17.

In the above-mentioned drive apparatus, two pins, the pin 26 for driving the bracket 25 and the pin 27 for operating the control member 28 are employed. However, as shown in FIGS. 17 and 18, it can be designed in such a manner that a control member 35 is operated by a pin 34 for driving the bracket. In the drive apparatus, only one pin is required, so that the construction of the drive apparatus can be simplified. In each drive apparatus so far mentioned, a chain is used as the rotation transmitting member, but a belt can also be used for the same purpose.

In the electrophotographic copying machine employing the above-mentioned drive apparatuses, the following pressure plate holding apparatus can be employed.

Figure 20:
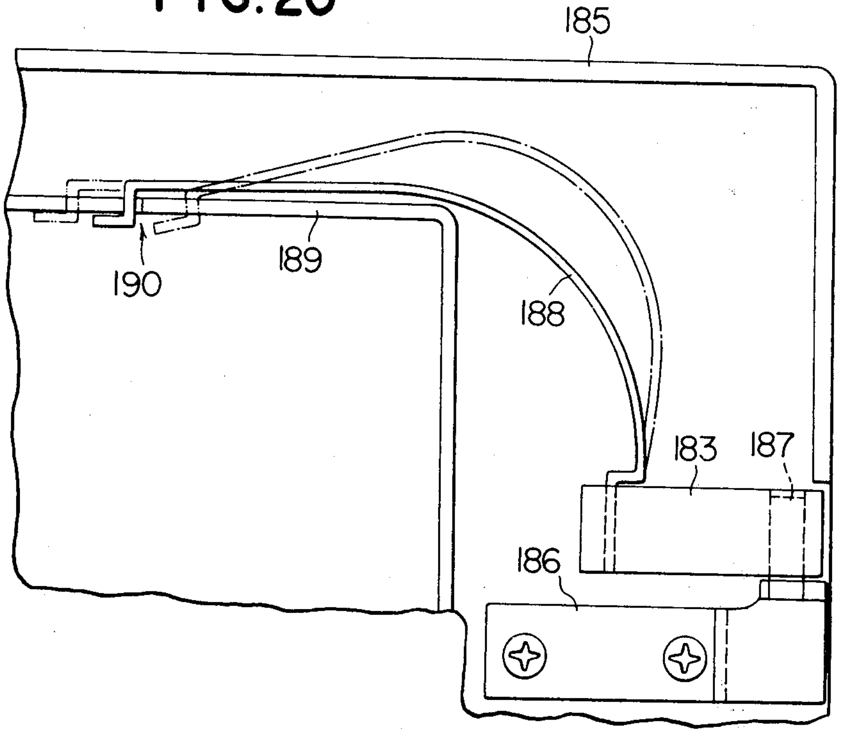
FIG. 20 shows the deformation of an elastic member in the pressure plate holding apparatus of FIG. 19.

Referring to FIG. 20, a contact glass 181 is supported by a holding member 182. To an upper surface of the holding member 182, a pair of bearing members 183 for a pressure plate 185 are fixed by screws (not shown). In FIG. 20, one bearing member 183 is shown. The pressure plate 185 is pivotally mounted on an opening and closing shaft 187 through a bracket 186 fixed to a base portion of the pressure plate 185 by screws and through the bearing members 183.

To the pressure plate 185, an elastic foam member 192 is attached, which is covered with a white flexible film 192*a*.

Furthermore, there are disposed a pair of elastic linear members 188. Fin in FIGS. 19 and 20, one of the elastic linear members 188 is shown. As shown in FIG. 20, one end of the elastic member 188 is fitted into a hole formed in the bearing member 183 so as to be supported by the bearing member 183. The other end of the elastic member 188 engages with a notch 190 formed in part of a rib 189 of the pressure plate 185 in such a manner that the engagement of the elastic member 188 with the pressure plate 185 does not restrict the swinging of the elastic member 188 about its engagement portion with the pressure plate 185.

Figure 19:
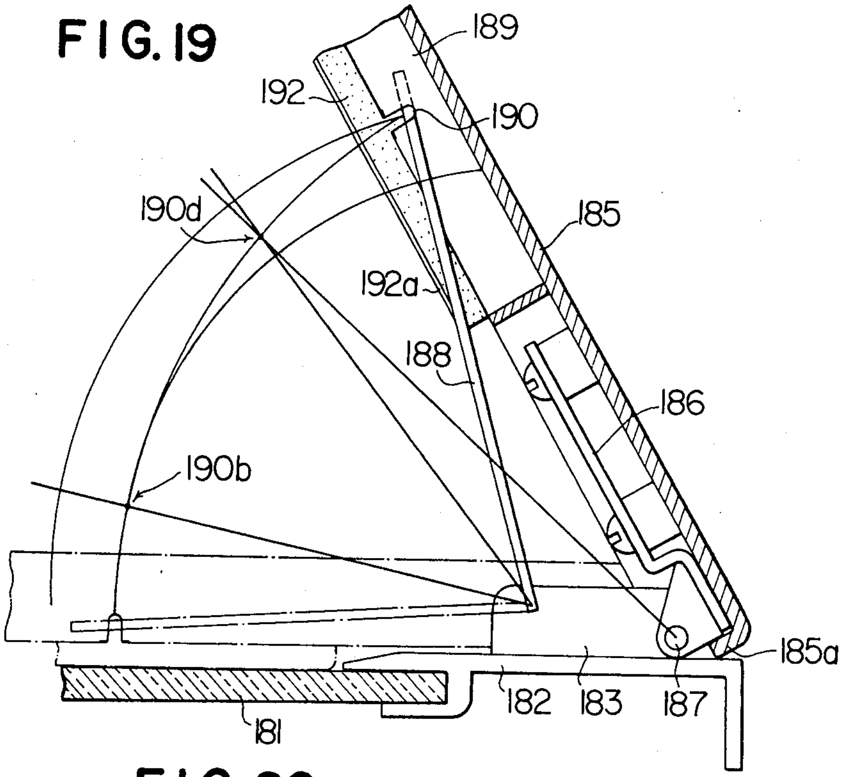
FIG. 19 is a partially sectional view of a pressure plate holding apparatus that can be used in the invention.

In the postures of the elastic members 188 shown in FIG. 19, the posture indicated by the solid line is the posture when the pressure plate 188 is opened. The posture indicated by the alternated long and short dash line is the posture when the pressure plate 185 is closed, while the posture indicated by the alternated long and two short dash line is the posture when the pressure plate 185 is in a free state. The bending angle of the elastic member 188 is greather than 90° when the pressure plate 185 is closed.

The other elastic member 188, which is not shown in FIGS. 19 and 20, is disposed in the same manner as mentioned above and its shaft is positioned in the same axis as that of the first mentioned elastic member 188.

The elastic members 188 are bent within a plane which is almost parallel to the closed pressure plate 185.

The change point of each elastic member 188 is on the line connecting between the swinging center of the pressure plate 185 and the swinging center of the elastic member 188. When the engagement point of the elastic member 188 with the pressure plate 185 is in a position indicated by reference numeral 190*b* in FIG. 19, each elastic member 188 is most bent and accordingly its resilience is maximum. However, since that resilience works on the line connecting between the swinging center of the pressure plate 185 and the swinging center of the elastic member 188, the above-mentioned resilience which is applied to the pressure plate 185 at the point 190*b* does not work as the force for rotating the pressure plate 185.

As the pressure plate 185 is opened, passing the dead point, the elastic member 188 is less bent, so that its resilience gradually decreases. However, since the swinging shaft of the pressure plate 185 and the engagement point of the elastic member 188 with the pressure plate 185 are apart from each other, the rotating moment in the direction for opening the pressure plate 185, due to the resilience of the elastic member 188, increases as the moment arm increases surpassing the decrease of the above-mentioned resilience. On the other hand, to the pressure plate 185, there is applied rotating moment caused by the gravity of the pressure plate 185, in the direction for closing the pressure plate 185. However, this rotating moment decreases as the pressure plate 185 is opened, since the moment arm is shortened as the pressure plate 185 is opened. The rotating moment by the gravity of the pressure plate 185 and the rotating moment of the elastic members 188 are well-balanced when the engagement point of the elastic members 188 with the pressure plate 185 occupies the point indicated by reference numeral 190*d* in FIG. 19.

When the pressure plate 185 is further opened beyond the point 190*d*, the moment of the elastic members 188 for opening the pressure plate 185 becomes predominant, so that the pressure plate 185 is rotated in the opening direction by the predominant moment. This rotation is hindered when a base portion 185*a* of the pressure plate 185 comes into contact with the holding member 182. Thus, the pressure plate 185 is kept open at about 60° of opening angle in a stable manner by the moment of the resilience of the elastic member pair 188 which is applied to the pressure plate 185.

On the contrary, when the pressure plate 185 is closed beyond the change point 190*b*, the gravity of the pressure plate 185 and the resilience of the elastic members 188 each produce rotating moments, and both rotating moments work in the direction for closing the pressure plate 185, whereby the pressure plate 185 is maintained in a closed position, and if there is an original document on the contact glass 181, the pressure plate 185 brings the document into close contact with the contact glass 181.

A feature of the present pressure plate holding apparatus is that it is very simple in construction.

As the elastic members 188, other than the above-mentioned linear members, band-shaped members can be employed. As the linear elastic member, piano wire can be used. In this case, no particular members for fixing or holding the wire is necessary as explained above.

Furthermore, in the above-mentioned pressure plate holding apparatus, since the elastic members 188 are bent within a plane nearly parallel to the pressure plate 185, all mechanisms for preventing leakage of illumination light can be incorporated in a marginal portion of the pressure plate 185 which is designed to be greater than an actual document holding portion.

Furthermore, in the above-mentioned pressure plate holding apparatus, one of each elastic member 188 which is bent almost 90° is supported by the bearing member 183, while the other end engages with the notch 190 formed in the rib 189 of the pressure plate 185. However, as shown in FIG. 21, the following arrangement of the elastic members can be adopted. One end of an elastic member 198 is supported by the bearing member 183 and the elastic member 198 is bent by 180° as shown in FIG. 21 and the other end of the elastic member 198 can be brought into contact with a corner portion of the rib 189 of the pressure plate 185 so as to engage slidably with the pressure plate 185. In the case of this arrangement, instead of the two elastic members 198, one elastic member 198 can be disposed in a central portion of the pressure plate 185.

Figure 22:
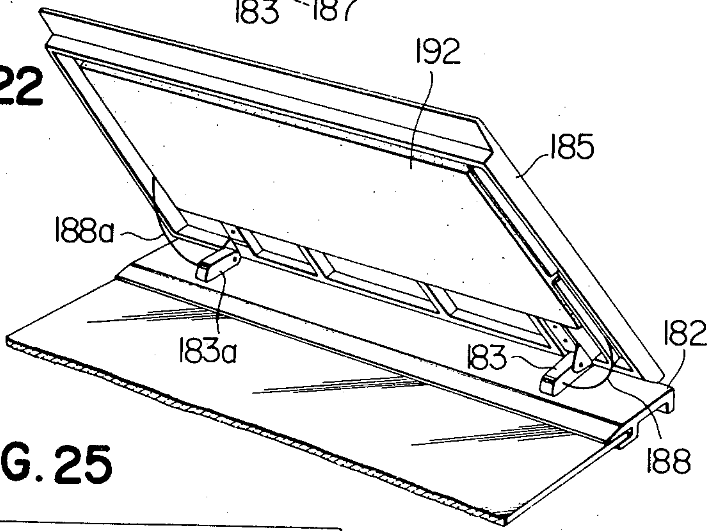
FIG. 22 is a perspective view of the pressure plate holding apparatus of FIGS. 19 and 20.

Referring to FIG. 22, there is shown perspectively the pressure plate holding apparatus and the pressure plate, which have been explained by reference to FIGS. 19 and 20. In FIG. 22, the pressure plate 185 is opened and reference numerals 183*a* and 188*a* represent respectively a counter part member of the bearing member 183 and a counter part member of the elastic member 188. It is preferable that the opening angle of the pressure plate 185 be set in the range of 30° to 80°, more preferably in the range of 50° to 70°.

Figure 23:
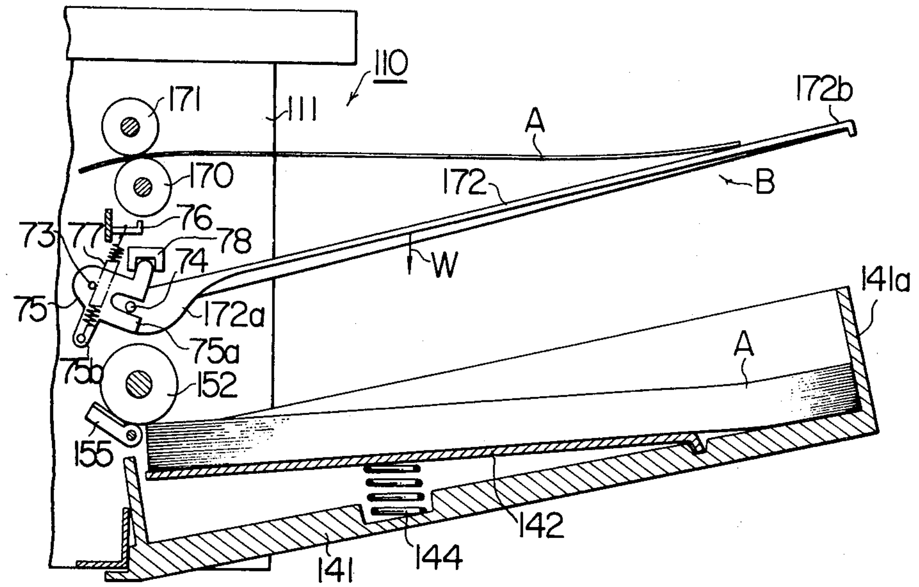
FIGS. 23 and 24 show a cross section of a sheet discharge tray for use in the invention.

Furthermore, in the electrophotographic copying machine (FIG. 3) to which the invention can be applied, a sheet discharge tray as shown in FIG. 23 can be employed.

In FIG. 23, a sheet discharge tray 172 is supported with its base portion 172*a* rotatably held through a support shaft 73. A pressing projection 74 is disposed at an appropriate distance from the shaft 73. Since moment which is generated due to the application of the weight W of the sheet discharge tray 172 to the center of the support shaft 73 is applied to the pressing projection 74, clockwise moment is always applied to the pressing projection 74. In order to keep the sheet discharge tray 172 at image transfer position B for receiving the transfer sheet A from a pair of sheet discharge rollers 170, 171, a stop member 75 for preventing the clockwise rotation of the pressing projection 74 is pivotally mounted on a shaft 73. The stop member 75 is formed in such a shape that a U-shaped stop arm 75*a* stops the pressing projection 74 of the sheet discharge tray 172. A projected arm 75*b* is extended from a lower portion of the stop arm 75*a*. To an end portion of the projected arm 75*a*, one end of a coil spring 77 is fixed, while the other end of the coil spring 77 is fixed to a hook 76 of the base plate 111. And tension is given between the hook 76 and the end portion of the projected arm 75*b* by the coil spring 77. Since the stop arm 75*a* to which counterclockwise moment is applied by the tension of the coil spring 77 pushes the pressing projection downwards, the sheet discharge tray 172 is supported at a predetermined position, namely at the image transfer position B, by the above-mentioned moment, against the gravity of the sheet discharge tray 172. When the stop member 75 is rotated forcibly clockwise about the support shaft 73, the hook 76, the support shaft 73 and the end portion of the projected arm 75*b* are arranged in a straight line, so that the stop member 75 reaches its dead point. However, when the stop member 75 is further rotated beyond the dead point, the tension of the coil spring 77 works so as to shorten the distance between the hook 76 and the projected arm 75*b*. Therefore, clockwise moment is applied to ths top member 75, so that downward force is applied to the sheet discharge tray 172 through the pressing projection 74. As a result, the sheet discharge tray 172 is rotated downwards about the support shaft 73, and is then stopped at a stop position C, where a rotatable end 172*b* of the sheet discharge tray 172 is in contact with a side edge 141*a* of a transfer sheet table 141. Since the stop member 75 makes a snap motion on both sides of its dead point, the sheet discharge tray 172 can be positioned at a normal position, namely at the image transfer position B simply by pushing the sheet discharge tray 172 upwards. By this pushing operation, since the pressing projection 74 rotates the stop arm 75*a* counterclockwise about the support shaft 73, thereafter by the snap motion of the stop member 75 the stop member 75 automatically stops the sheet discharge tray 172 at the image transfer position B. An upper end of the stop arm 75*a* of the stop member 75 can be designed so as to come to contact with a lead switch 78 attached to the base plate 111, turning the lead switch 78 on, when the sheet discharge tray 172 is held at the image transfer position B. In this case, by connecting the lead switch 78 in series with a main switch (not shown) of the copying machine 110, which is cooperative with the lead switch 78, the copying machine 110 can be designed in such a manner that it is not connected to power source even if the main switch S is turned on, unless the sheet discharge tray 172 is at the image transfer position B.

Otherwise, the lead switch 78 is constructed as the main switch S in such a manner that, when the sheet discharge tray 172 is in the image transfer position B, the copying machine 110 is connected to power source, and when the sheet discharge tray 172 is pushed downwards so as to cover the transfer sheet table 141, to the stop position C, the copying machine 110 is disconnected from power source. In this construction, the connection and disconnection of power source can be easily seen from the position of the sheet discharge tray 172.

Figure 25:
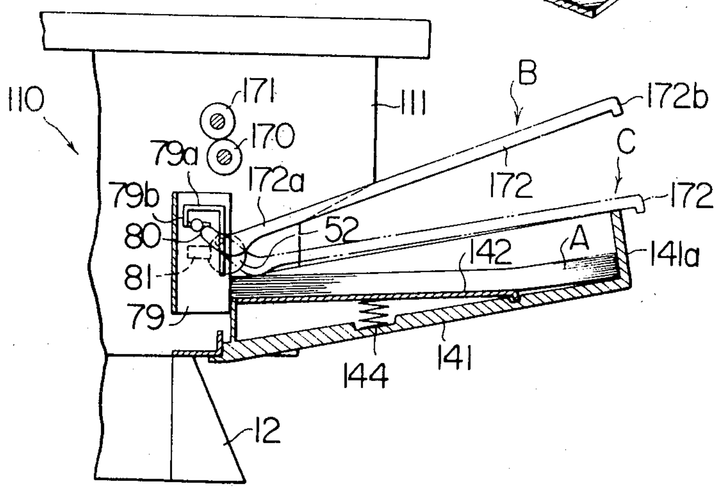
FIG. 25 is a schematic cross section of another sheet discharge tray.
Figure 24:
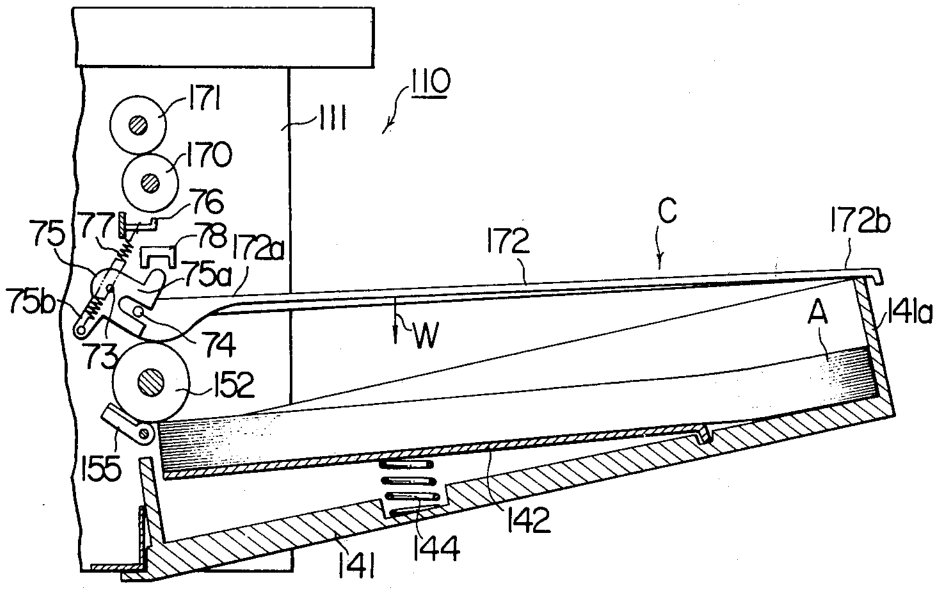

In the above-mentioned sheet discharge tray, so long as the sheet discharge tray 172 is designed to be movable so as to be positioned at the image transfer position B or at the stop position C, other modification can be allowed. For example, as shown in FIG. 25, the sheet discharge tray 172 can be attached to a guide plate 79 fixed to the base plate 111. In this case, a nine-shaped slit 79*a* is formed in the guide plate 79. A stop projection 80 of the sheet discharge tray 172 slidably engages with the slit 79*a*. In order to set the sheet discharge tray 172 at the image transfer position B, the stop projection 80 is stopped at a hook-shaped portion 79*b* in an upper portion of the slit 79*a* and, at the same time, a base portion 172*a* of the sheet discharge tray 172 is brought into contact with a receiving member 81 fixed to the base plate 111. In order to set the sheet discharge tray 172 at the stop position C, the sheet discharge tray 172 is detached from the hook-shaped portion 79*b* and is caused to slide along the slit 79*a* and then the stop projection 80 is held at a lower portion of the slit 79*a*. In this position, the rotatable end 172*b* of the sheet discharge tray 172 comes to contact with the side edge 141*a* of the transfer sheet table 141 and the base portion 172*a* is disposed near the opening of the transfer sheet table 141, whereby the transfer sheets A placed on the transfer sheet table 141 can be more securely covered with the sheet discharge tray 172 than in the sheet discharge tray shown in FIGS. 23 and 24.

Figure 26:
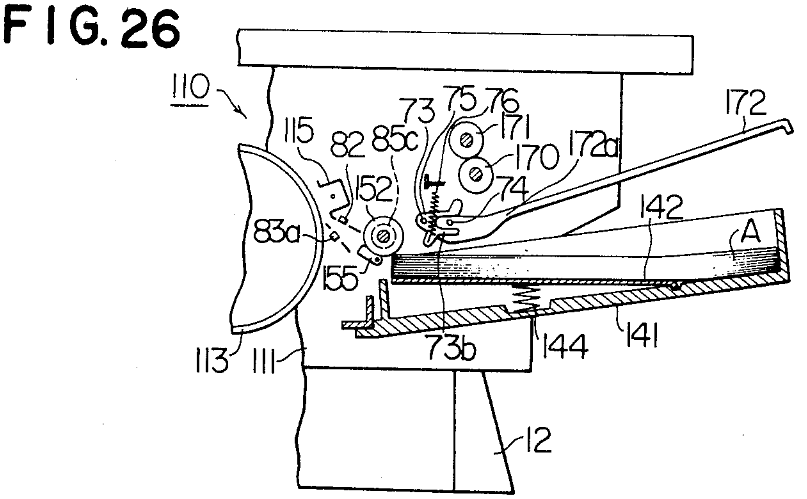
FIG. 26 is a schematic cross section of a further sheet discharge tray.
Figure 27:
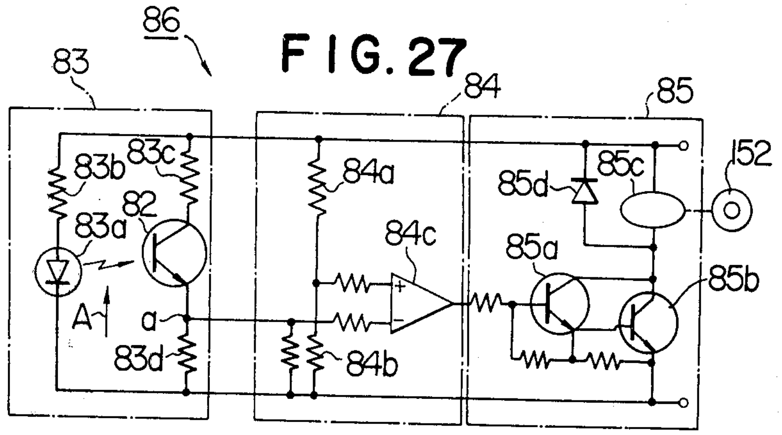
FIG. 27 is a circuit diagram for use in the sheet discharge tray of FIG. 26.

Referring to FIG. 26, there is shown a further sheet discharge tray 172. In this case, the transfer sheet table 141 is inserted into the copying machine 110, whereby a portion of the transfer sheets A exposed to the outside of the copying machine 110 is reduced. In this case, the sheet discharge tray 172 can be minimized in size and it is unnecessary to make the sheet discharge tray 172 in a size capable of using it as a lid of the sheet transfer table 141. This can be applied to an electrophotographic copying machine 110 from which the registration rollers 156, 157 (FIG. 3) disposed between the sheet feeding roller 152 and the image transfer charger 115 (FIG. 3). In the electrophotographic copying machine, the operation performed by the registration rollers 156, 157 is performed by a sensor 82. More specifically, the leading edge of the transfer sheet A supplied from the transfer sheet table 141 is detected by the sensor 82, and the sheet feeding roller 152 is operated by a clutch operation circuit 86 comprising a photoelectric conversion section 83, a comparator section 84 and a switch operation section 85, as shown in FIG. 27, so that a visible image bearing portion of the photoconductor drum 113 is set in conformity with the leading edge portion of the transfer sheet A. The photoelectric conversion section 83 serves to increase the voltage at a point a since the sensor 82 which is a photodiode reduces the resistivity upon receiving the light of a light emitting diode 83*a*. In FIG. 27, reference numerals 83*b* and 83*c* represent current adjustment resistors and reference numeral 83*d* represents an adjustment resistor for the photodiode.

The comparator section 84 comprises a comparator IC 84*c* for comparing a reference voltage determined by adjustment resistors 84*a*, 84*b* with the voltage at the point a. The switch operation section 85 consists essentially of transistors 85*a*, 85*b* for amplifying the comparison results obtained by the comparator section 84, and a clutch 85*c* which is actuated by the amplified current. In FIG. 27, reference numeral 85*d* represents a diode for protecting the transistors 85*a*, 85*b* from excess current generated due to connecting and disconnecting operation of the clutch 85*c*. Because of the above-mentioned construction, when the transfer sheet A does not reach the position of the sensor 82, the voltage at the point a becomes high, so that the comparator IC 84*c* judges that the voltage is higher than the reference voltage and indicates a low voltage as its output. As a result, the transistors 85*a*, 85*b* are deenergized (OFF) and the clutch 85*c* is not actuated. In other words, since the clutch 85 is not disconnected, the sheet feeding roller is rotated continuously. However, when the transfer sheet A reaches the position of the sensor 82, the clutch 85*c* is disconnected, whereby the rotation of the sheet feeding roller 152 is stopped. In the construction, by connecting a switch (not shown) to an electrode of the clutch 85*c* in order that the transfer sheet A be transported by rotating the sheet feeding roller 152, with the current for operating the clutch 85*c* disconnected, when an image area of the photoconductor drum 113 comes to a predetermined rotated position, and by setting the clutch 85*c* so as to be capable of being disconnected by the command link 160 (FIG. 3), the sensor 82 can detect the leading edge of the transfer sheet A and the sheet feeding roller 152 can perform the registering operation. Therefore, the sheet feeding roller 152 can also perform the function of the registration rollers 156, 157. In the above-mentioned sheet discharge tray, the transfer sheets A on the transfer sheet table 141 are less exposed to the outside, it is unnecessary to make the sheet discharge tray 172 in a large size capable of covering the transfer sheets A. In other words, the sheet discharge tray can be reduced in size.

In the copying machine in FIG. 3 to which the invention can be applied, various types of detaching apparatus for detaching a member disposed near the photoconductor drum, such as a squeeze roller, can be employed as will be explained by reference to FIG. 28 through FIG. 34.

Figure 28:
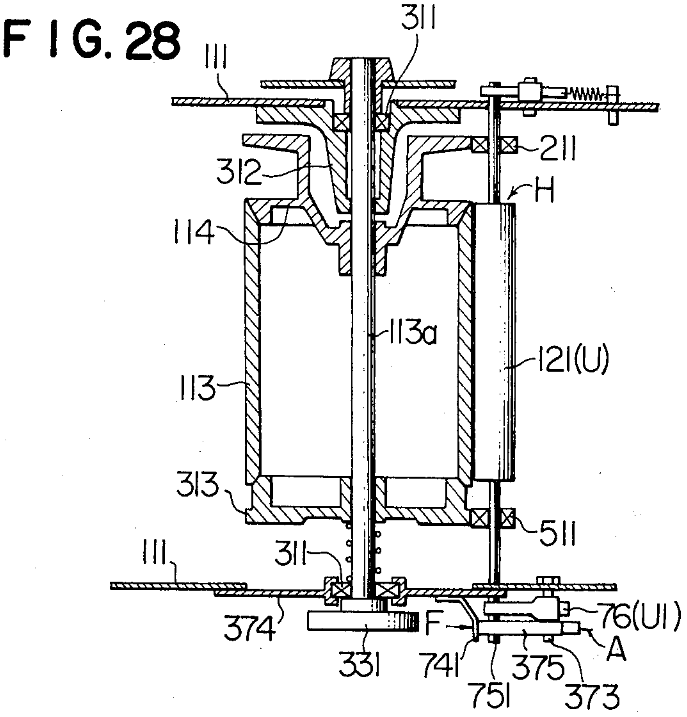
FIG. 28 is a cross section of a detaching apparatus for a reverse roller that can be used in the invention.

Referring to FIG. 28, a center support shaft 113*a* for supporting rotatably the photoconductor drum 113 through bearings 311 is supported between the parallel base plates 111. To the front base plate 111, a plate 374, to which the bearing 311 is fixed, is fixed by drum attachment screws 331, while to the back base plate 111, there are fixed the counterpart bearing 311 and a support frame 312 for supporting one end of the center support shaft 113*a* in a position away from the bearing 311. The photoconductor drum 113 is held between a front flange 313 which is detachable from the center support shaft 113*a* and a back flange 314 fixed to the center support shaft 113*a*. On another shaft, there are mounted integrally a squeeze roller 121 and a pair of bearings 511 for the squeeze roller 121. Since the bearings 511 are in contact with the peripheral surface of each of the flanges 313, 314, the squeeze roller 121 can be rotated at a predetermined position H by the rotation of the shaft. The bearings are in such positions as to scratch the surface of the drum 113, if they are detached from between the flanges 313, 314 as they are. In order to prevent such scratching, a detachment apparatus A is attached. On a support shaft 373 projected from the base plate 111, there is mounted a release lever 375 having a pressure contact portion 751 which can be rotated clockwise in FIG. 29 by pressing force F from a projected portion 741 of the plate 374. Furthermore, a roller support arm 376, which is a unit arm u1, is pivotally mounted on the support shaft 376 so as to be positioned beside the release lever 375 and also in such a manner that the squeeze roller 121 is positioned parallel to the surface of the drum 113. The unit arm u1 is connected to a connecting ends 761, 762 of the release lever 375 through a stretching spring 771 which is an elastic member 377. The roller support arm 376 has a tendency of positioning the center of its gravity on a vertical line of the support shaft 373 due to the gravity of the squeeze roller 121. However, when the plate 374 is fixed at a predetermined position by the operation of fitting a projected portion 111*a* in the base plate 111 into a joint hole 742, the projected portion 741 of the plate 374 applies the pressing force F to the pressure contact portion 751. The projected portion 741 can be made integrally with the plate 374 such that the projected portion 741 is projected with a slope from the plate 374. The projected portion 741 can also be made of a plate spring S so as to produce the pressing force F elastically, whereby the projected portion 741 can be surely brought into pressure contact with the pressure contact portion 751. When the release lever 375 is rotated clockwise, the roller support arm 376 can be positioned at the predetermined position H, where the squeeze roller 121 is elastically directed to the drum 113, through the stretching spring 771 which serves as an elastic member. When the plate 374 is removed from the base plate 111, since the pressing force F generated by the projection portion 741 is removed from the pressure contact portion 751, the roller support arm 376 connected by the release lever 375 and the stretching spring 771 is actuated, on the support shaft 373, only by the rotating bias caused by its own weight. In other words, by the weight of the roller support arm 376, the squeeze roller 121 is detached from the predetermined position H, while being rotated, so that the center of its gravity is shifted in the direction of the perpendicular line of the support shaft 373. Even if the drum 113 is taken out from the center support shaft 113*a* after this, since the squeeze roller 121 is sufficiently separated from the surface of the drum 113, the surface of the drum 113 is not scratched. In this case, to the squeeze roller 121, there is given counterclockwise rotation by a scraper 512 made of a thin mylar sheet for removing residual liquid developer from the squeeze roller 121. Therefore, the squeeze roller 121 can be surely detached from a predetermined position by the removal of the plate 374. In this detaching apparatus, in contrast to a conventional detaching apparatus, only one stretching spring 771 and one support shaft for supporting the roller support arm 376 and the release lever 375 are required, and furthermore, the release lever 375 and the roller support arm 376 are simplified in construction. Furthermore, the squeeze roller 121 is rotated about the support 373 by the pressing force F which is received by the pressure contact portion 751, so that the squeeze roller 121 is positioned elastically. In the meantime, the squeeze roller 121 is detached from the predetermined position H to a retracted position I by the weight of the squeeze roller 121 itself. In this sense, its operation is very natural, which makes it possible to use stably for a long period of time.

Figure 31:
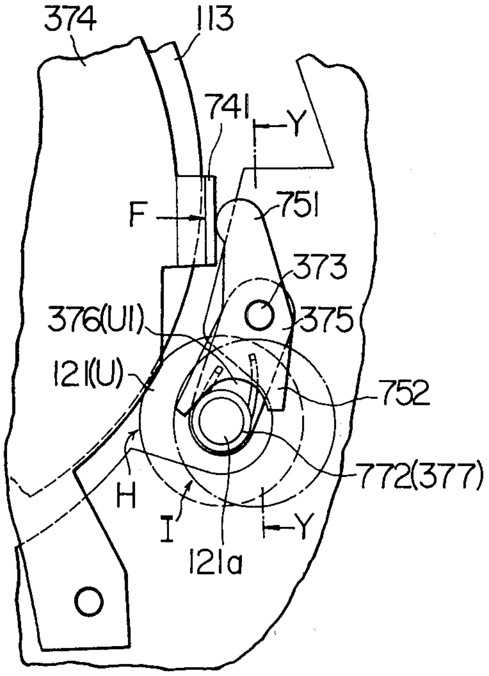
Figure 33:
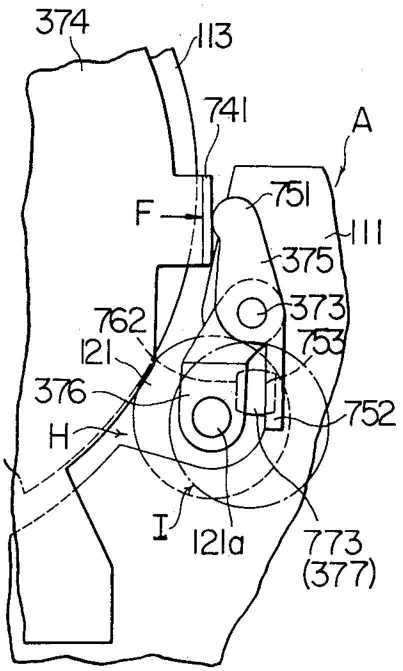

An essential feature of the detaching apparatus is that when the projected portion 741 of the plate 374 and the pressure contact portion 751 of the release lever 375 are in pressure contact with each other, the elastic member 377 equipped between the release lever 375 and the unit arm u1 is energized, so that the unit member, such as the squeeze roller, is to the predetermined position H and when the plate 374 and the pressure contact portion 751 are separated from each other, the unit member is detached from a predetermined position. So long as this feature is maintained, the detaching apparatus can be modified in many ways. For example, as shown in FIGS. 31 and 32, the squeeze roller shaft 121*a* of the roller support arm 376 is equipped with a coiled spring 772 whose one end is stopped near the squeeze roller shaft 121*a* of the roller support arm 367 and whose other end is a connecting end 752 of the release lever 375. Under this condition, when the projected portion 741 of the plate 374 applies the pressing force F to the pressure contact portion 751 of the release lever 375, the release lever 375 receives clockwise moment, which is transmitted to the squeeze roller shaft 121*a* of the roller support arm 376 through the coiled spring 772. As a result, the squeeze roller 121 is positioned elastically to the predetermined position H. When the pressing force F is eliminated, the squeeze roller 121 is retracted from the predetermined position H to the retracted position I and, at the same time, the release lever 375 is rotated counterclockwise. In this case, if the release lever 375 is formed in such a shape that the center of its gravity is on the side of the connecting end 752 relative to the support shaft 373, the release lever 375 is supported, while the pressure contact portion 751 is being situated above the support shaft 373. This detaching apparatus has a feature that it can be made compact in size due to the use of the coiled spring 772. Furthermore, in this detaching apparatus, a compressed rubber 773 can be used as the elastic member. To be more specific, as shown in FIG. 33, the compressed rubber 773 is placed between the connecting end 752 of the release lever 375 and the roller support arm 376 which is directed to the connecting end 752. One side of the compressed rubber 773 is fitted in and bonded to a receiving portion 762 which is formed in a concave shape in an end portion of the roller support arm 376, while other side of the compressed rubber 773 is fitted in and bonded to a receiving portion 753 which is formed in a concave shape in the connecting end 752. Therefore, since the release lever 375 is rotated clockwise when the pressing force F is applied thereto from the projected portion 741, the squeeze roller 121 is elastically positioned at the predetermined position H through the compressed rubber 773.

Figure 34:
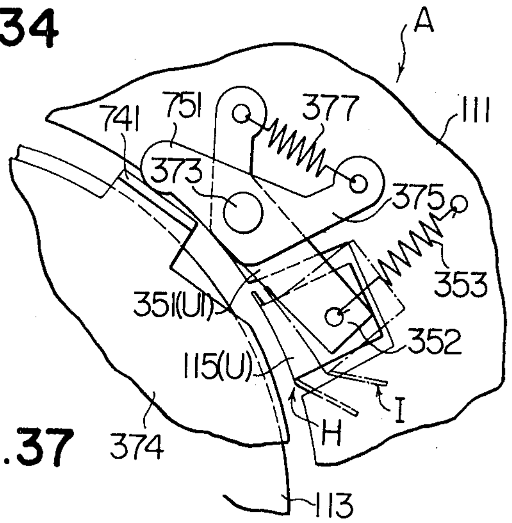

The unit member u and the unit arm u1 are pivotally mounted, their attachment states are not limited to this. A construction in which a cleaning blade or a variety of chargers (not shown) are fixed as the unit member u to the unit arm u1 can also be used. Furthermore, in each detaching apparatus so far mentioned, the unit member u is detachable from the predetermined position H by its own weight, but the manner of its detachment is not limited to this. For example, as shown in FIG. 34, when a stretched spring 353 capable of pulling upwards the unit member, for example, an image transfer charger 115 from the predetermined position H to the retracted position I is disposed near a rotation end 352 of a charger support arm 351, which is the unit arm u1, the unit member u can be operated against its weight.

In each detaching apparatus so far mentioned, a variety of unit members u, which are disposed around the peripheral surface of the photoconductor drum 113, can be moved from a predetermined position H to a retracted position I prior to their detachment, which facilitates detachment of the drum 113 and prevention of damage of the drum 113 which may occur during the detachment step.

In the copying machine shown in FIG. 3 to which the invention can be applied, the following liquid developer circulation systems and developer pumps with developer flow routes can be employed, which are shown in FIG. 35 to FIG. 38.

Referring to FIG. 35, there is shown a liquid developer circulation system. In the system, a developer pump 473 with a developer flow route is constructed such that the connection ends of a liquid developer supply route 474 and a circulation 475 are collected in one portion, so that they can be connected to a developer inlet 476 and a developer outlet 744 in an opening portion 136*a*.

In the developer pump 473 with the developer flow route, a pump portion 478 is disposed vertically and, above the pump portion 478, there are formed a developer flow-out route 479 for introducing a liquid developer coming from the pump portion 478 to a liquid developer supply route 474; and a circular developer flow-down route 480 around the pump portion 480, which is connected to a circulation route 475. These are attached integrally to the opening portion 136*a* of a liquid developer container 136. The pump portion 478 is constructed in such a manner that a suction inlet 478*b* is formed in a lower end of a cylindrical frame 478*a*, a support member 478*c* is disposed near the inside of the suction inlet 478*b*, a rotary shaft 478*d* is pivotally attached to the support member 478*c*, and a moving blade 478*e* is fixed to the rotary shaft 478*d*. The rotary shaft 478*d* is rotated by a drive motor 481 disposed at an upper portion of the pump portion 478. When the drive motor 481 is in operation, the liquid developer A sucked from the suction inlet 478*b* is introduced to the liquid developer supply pipe 138 which constitutes the liquid developer supply route 474, passing through the developer flow-out route 479, whereby the liquid developer A is supplied to a development apparatus 119. Furthermore, a circulation liquid A1, which has passed through development process, is caused to flow down on a receiving tray 140. The circulation liquid A1 collected in the receiving tray 140 passes through a liquid discharge pipe 482 which constitutes a circulation route 475, whereby the circulation liquid A1 is introduced into a recovery chamber 483 through the liquid inlet 476 of the liquid developer container 136. In the opening portion 136*a* of the liquid developer container 136, the liquid inlet 476 and the liquid outlet 477 are separated and, furthermore, there is disposed an opening separation member 484 which makes it possible to connect the developer flow-down path 480 and the suction inlet 479*b* of the developer pump 473 with the developer flow route to the developer inlet 476 and the developer outlet 477, respectively. The opening separation member 484, which is cylindrical, has a flange portion 484*a* which engages with an upper edge 136*b* of a peripheral wall of the opening portion 136*a*.

Furthermore, on the peripheral wall of the opening separation member 484, an appropriate number of stop members 484*b* projected elastically in its outer peripheral direction are disposed. The stop member 484 serves to attach securely the opening separation member 484 to the opening portion 136*a* by bringing elastically a top end portion of the stop member 484*b* into pressure contact with a concave portion 136*c* in the peripheral wall of the opening portion 136*a* when the opening separation member 484 is attached to the opening portion 136*a*. In the peripheral edge of the opening separation member 484, there is formed the developer inlet 476 which is connected to the developer flow-down route 480. Further, an appropriate number of openings 484*c* to the recovery chamber 483 of the developer inlet 476 are formed in the central peripheral wall of the opening separation member 484. In a lower portion of the opening separation member 484, there is formed the developer outlet 477 directed downwards, in which a top end of the cylindrical frame 478*a* of the pump portion 478 is fitted. To the developer outlet 477, a flow route path formation member 485, which extends into the recovery chamber 483 from the developer outlet 477, is connected. A suction inlet 485*a* of the flow route formation member 485 is formed so as to be capable of sucking the liquid developer A which exists away from the opening portion 136*a*. In a desk top copying machine, in order to minimize its height, a flat liquid developer container is used. However, in the case of a wide developer container, mixing of the developer in the container by vertical flow of the developer cannot be expected. Therefore, it is required to mix the developer by horizontal flow of the developer. In order to attain this, the flow route path formation member 484 is connected to the developer outlet 477 and the suction inlet 485a is formed, separated as much as possible from the developer inlet 476.

By the flow path formation member 485, it is prevented that a low concentration developer is directly directed to the developer outlet 477 from the developer inlet 476. Thus, the liquid developer flows horizontally from the developer inlet 476, while being mixed, so that the liquid developer A with a uniform concentration is supplied to the development apparatus 118 from the suction inlet 485a, passing through the developer outlet 477. The cylindrical frame member 478a is equipped with an O ring 478f for keeping air tight connection between the developer outlet 477 and the cylindrical frame member 478a.

The pump portion 478 of the developer pump 473 with the developer flow route thus constructed can be immersed into the liquid developer A in the liquid developer container 136 by pushing the developer pump 473 so as to pass through the opening portion 136a of the liquid developer container 136, whereby the suction inlet 478b of the pump portion 478 can be connected to the developer outlet 477 within the liquid developer A and, at the same time, the flow-down route 480 of the circulation liquid A1 and the developer inlet 476 are connected to each other. By connecting the developer pump 473 with the developer flow path to the liquid developer container 136 in the above-mentioned manner, a liquid developer circulation system B is completed, which does not have the conventional shortcomings, such as leakage of the circulation liquid and lack of supply of the developer, which damage the photoconductor.

Referring to FIG. 36, there is shown another liquid developer circulation system. In the developer pump 473 having a developer flow route, the drive motor 481 is fixed to a base plate 11. The rotating drive force of the drive motor 481 is transmitted to the rotating shaft 478d of the pump portion 478 of the developer pump 473 by a flexible rotation transmitting member 481a. By this construction, the developer pump 473 with the developer flow route can be reduced in weight, and the developer pump 473 can be operated at a place away from the liquid developer container 136. Furthermore, since vibrations of the drive motor 481 are absorbed by the base plate 11, vibrations and shift of the liquid developer container 136 can be prevented.

FIG. 37 shows a further liquid developer circulation system. In the developer pump 473 of the system, the suction inlet 478b performs the function of the developer outlet 477. To the developer outlet 477, there are attached a support member 478c and a rotary shaft 478d which is supported by the support member 478c. To one end portion of the rotary shaft 478d, there are fixed the moving blades 478d directed to the suction inlet 478b, and to the other end portion thereof, there is disposed a clutch 478g capable of being connected or disconnected to or from the rotary shaft 478d, whereby a lower portion 473b of the developer pump 473 is formed. The clutch 478g is constructed as shown in FIG. 37. To one side of the rotary shaft 478d, there is attached a receiving member 478h, and to the other side of the rotary shaft 478d, there is attached a drive member 478i having a concave portion in which the receiving member 478h is fitted. The connection of the clutch 478g can be performed by pushing downwards a upper portion 473a containing an upper portion of the pump portion 478 of the developer pump 473 into the opening separation member 484 which supports the lower portion of the pump portion 478, whereby the developer pump 473 is united and the connection of the clutch 478g is completed. By the above-mentioned construction, the weight of the developer pump 473 can be reduced and its detachment is facilitated. In the above liquid developer circulation system, as the pump portion 478, an axial-flow pump is employed. However, the pump portion 478 is not limited to this, but spiral pump, screw pump and gear pump can be employed equally.

What is claimed is:

1. A guide apparatus for guiding a movable contact glass, which serves as an original table in an electrophotographic copying machine, in an exposure scanning direction, in order to expose an original document stacking surface of the contact glass at a predetermined exposure position comprises:

a drive apparatus for reciprocating said contact glass in the exposure scanning direction; and a guide member, which is shorter than the distance from said exposure position to the center of gravity of said contact glass at completion of the exposure scanning and whose upper surface at said exposure position is higher than the other upper surface thereof.

2. A guide apparatus as in claim 1, wherein said contact glass is supported only by said upper surface of said guide member.

3. A guide apparatus as in claim 1 or 2, wherein the upper surface of said guide member at said exposure position is higher than the upper surface of the opposite end portions of said guide member.

4. A guide apparatus as in claim 1 or 2, wherein the upper surface of said guide member on one side thereof beside said exposure position is lower than the other upper surface.

5. A guide apparatus as in claim 1, wherein said drive apparatus comprises a loop drive transmission member which is rotated in one direction and a movable member which is reciprocated during one rotation of said loop drive transmission member and said contact glass is moved substantially integrally with said movable member.

6. A guide apparatus as in claim 5, wherein at least part of said loop drive transmission member is disposed parallel to said contact glass.

7. A guide apparatus as in claim 5, wherein said drive apparatus has a lock release apparatus having a lock release member capable of making said contact glass movable manually by moving said loop drive transmission member manually when said contact glass is stopped at a dead point thereof.

8. A guide apparatus as in claim 5, wherein said loop drive transmission member is provided with a projected member which is rotatable together with said loop drive transmission member and by the rotation of said projected member, a system for electrophotographic copying process in said electrophotographic copying machine is controlled.

9. A guide apparatus as in claim 7, wherein said drive apparatus further comprises a cooperative member between said lock release member and said projected member of said loop drive transmission member, said cooperative member being for moving said projected member so as to escape from its dead point, only when said lock release member is rotated in the direction opposite to the rotation of said loop drive transmission member in operation.

* * * * *